US012022522B2

(12) United States Patent
Lee et al.

(10) Patent No.: US 12,022,522 B2
(45) Date of Patent: Jun. 25, 2024

(54) METHOD FOR TRANSMITTING AND RECEIVING DISCOVERY REFERENCE SIGNAL, AND DEVICE FOR SAME

(71) Applicant: ELECTRONICS AND TELECOMMUNICATIONS RESEARCH INSTITUTE, Daejeon (KR)

(72) Inventors: Jung Hoon Lee, Daejeon (KR); Jae Heung Kim, Daejeon (KR); Cheul Soon Kim, Daejeon (KR); Tae Joong Kim, Daejeon (KR); Sung Hyun Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 346 days.

(21) Appl. No.: 17/422,218

(22) PCT Filed: Feb. 10, 2020

(86) PCT No.: PCT/KR2020/001807
§ 371 (c)(1),
(2) Date: Jul. 12, 2021

(87) PCT Pub. No.: WO2020/166902
PCT Pub. Date: Aug. 20, 2020

(65) Prior Publication Data
US 2022/0086914 A1 Mar. 17, 2022

(30) Foreign Application Priority Data

Feb. 15, 2019 (KR) .................. 10-2019-0017885
Feb. 28, 2019 (KR) .................. 10-2019-0023582
(Continued)

(51) Int. Cl.
H04W 74/0833 (2024.01)
H04W 16/14 (2009.01)
H04W 56/00 (2009.01)

(52) U.S. Cl.
CPC ....... H04W 74/0833 (2013.01); H04W 16/14 (2013.01); H04W 56/00 (2013.01)

(58) Field of Classification Search
CPC .. H04W 74/0833; H04W 16/14; H04W 56/00
(Continued)

(56) References Cited

U.S. PATENT DOCUMENTS 11,490,428 B2 * 11/2022 Tsai .................... H04W 74/085
11,743,942 B2 * 8/2023 Babaei ................. H04W 72/23
370/329

(Continued)

FOREIGN PATENT DOCUMENTS

KR 10-2018-0089901 A 8/2018

OTHER PUBLICATIONS

Search Report, mailed May 25, 2020 for International Application No. PCT/KR2020/001807.
(Continued)

Primary Examiner — Mong-Thuy T Tran
(74) Attorney, Agent, or Firm — LRK PATENT LAW FIRM

(57) ABSTRACT

An operation method of a terminal that receives a DRS in a mobile communication system operating in an unlicensed spectrum includes: receiving an SS/PBCH block included in the DRS; checking at least one monitoring occasion for a PDCCH for receiving RMSI on the basis of a PBCH included in the SS/PBCH; monitoring the at least one monitoring occasion and detecting the PDCCH for receiving the RMSI; and receiving a PDSCH including the RMSI on the basis of the detected PDCCH, wherein the at least one
(Continued)

monitoring occasion is set to at least one symbol among symbols in front of the PDSCH and symbols behind the PDSCH. Accordingly, the DRS and data may be reliably transmitted and received in the mobile communication system operating in the unlicensed spectrum.

18 Claims, 15 Drawing Sheets

(30) Foreign Application Priority Data

| | | |
|---|---|---|
| Apr. 29, 2019 | (KR) | 10-2019-0049922 |
| Aug. 7, 2019 | (KR) | 10-2019-0096154 |
| Aug. 22, 2019 | (KR) | 10-2019-0103133 |
| Oct. 7, 2019 | (KR) | 10-2019-0123936 |
| Nov. 7, 2019 | (KR) | 10-2019-0141815 |
| Nov. 20, 2019 | (KR) | 10-2019-0149856 |

(58) Field of Classification Search
USPC .......................................................... 370/329
See application file for complete search history.

(56) References Cited

U.S. PATENT DOCUMENTS

| | | | |
|---|---|---|---|
| 11,765,774 B2* | 9/2023 | Pan | H04W 74/0808 370/329 |
| 2018/0324678 A1 | 11/2018 | Chen et al. | |
| 2018/0368084 A1 | 12/2018 | Ko et al. | |
| 2019/0053176 A1 | 2/2019 | Lee et al. | |
| 2019/0059012 A1 | 2/2019 | Nam et al. | |
| 2019/0068348 A1 | 2/2019 | Nam | |
| 2019/0089474 A1 | 3/2019 | Ly et al. | |
| 2019/0098590 A1 | 3/2019 | Nam et al. | |
| 2019/0191457 A1* | 6/2019 | Si | H04W 48/12 |
| 2019/0379431 A1 | 12/2019 | Park et al. | |
| 2020/0015214 A1* | 1/2020 | Si | H04J 13/0029 |
| 2020/0022108 A1* | 1/2020 | Chen | H04W 72/232 |
| 2020/0053781 A1* | 2/2020 | Pan | H04W 72/30 |
| 2020/0213960 A1 | 7/2020 | Jung et al. | |
| 2021/0297193 A1* | 9/2021 | Noh | H04W 74/08 |
| 2021/0297968 A1* | 9/2021 | Alriksson | H04L 5/0091 |
| 2021/0329480 A1* | 10/2021 | Xia | H04W 24/08 |
| 2021/0377890 A1* | 12/2021 | Shen | H04L 5/005 |
| 2023/0070204 A1* | 3/2023 | Kim | H04W 74/0833 |
| 2023/0254084 A1* | 8/2023 | Alriksson | H04L 5/0053 370/329 |

OTHER PUBLICATIONS

Written Opinion, mailed May 25, 2020 for International Application No. PCT/KR2020/001807.

Ericsson, "Enhancements to initial access procedure", R1-1900999, 3GPP TSG-RAN WG1 Meeting AH#1901, Taipei, Taiwan, Jan. 21-25, 2019.

NTT Docomo, Inc., "Initial access signals and channels for NR-U", R1-1900950, 3GPP TSG RAN WG1 Ad-Hoc Meeting 1901, Taipei, Jan. 21-25, 2019.

Ericsson, "Initial access signals and channels for NR-U", R1-1900995, 3GPP TSG-RAN WG1 Meeting Ad Hoc 1901, Taipei, Taiwan, Jan. 21-25, 2019.

* cited by examiner

FIG. 15

| | | maximum DRX transmission window = 5ms | | | | | | | | | | |
|---|---|---|---|---|---|---|---|---|---|---|---|---|
| | | 1ms | | | | 1ms | | | | 1ms | | |
| 15kHz | SS/PBCH block candidate positions L=10 | slot #n | | slot #n+1 | | slot #n+2 | | slot #n+3 | | slot #n+4 | | |
| | | 0 | 1 | 2 | 3 | 4 | 5 | 6 | 7 | 8 | 9 | |
| | Q=4 | 1 | 1 | 0 | 0 | 1 | 1 | 0 | 0 | 1 | 1 | |
| 30kHz | SS/PBCH block candidate positions L=20 | slot #n | slot #n+1 | slot #n+2 | slot #n+3 | slot #n+4 | slot #n+5 | slot #n+6 | slot #n+7 | slot #n+8 | slot #n+9 | |
| | | 0 | 1 | 2 | 3 | 4 | 5 | 6 | 7 | 8 | 9 | |
| | | | | | | | | 10 | 11 | 12 | 13 | 14 | 15 | 16 | 17 | 18 | 19 |
| | Q=4 | 1 | 1 | 0 | 0 | 1 | 1 | 0 | 0 | 1 | 1 | 0 | 0 | 1 | 1 | 0 | 0 | 1 | 1 | 0 | 0 |

METHOD FOR TRANSMITTING AND RECEIVING DISCOVERY REFERENCE SIGNAL, AND DEVICE FOR SAME

CROSS-REFERENCE TO RELAYED APPLICATIONS

The present application is a U.S. National Phase entry from International Application No. PCT/KR2020/001807, filed Feb. 10, 2020, which claims priority to Korean Patent Application Nos. 10-2019-0017885, filed Feb. 15, 2019, 10-2019-0023582, Feb. 28, 2019, 10-2019-0049922, filed Apr. 29, 2019, 10-2019-0096154, filed Aug. 7, 2019, 10-2019-0103133, Aug. 22, 2019, 10-2019-0123936, filed Oct. 7, 2019, 10-2019-0141815, Nov. 7, 2019, and 10-2019-0149856, filed Nov. 20, 2019, the disclosure of which is incorporated by reference herein in their entirety.

TECHNICAL FIELD

The present invention relates to methods and apparatuses for transmitting or receiving a discovery reference signal (DRS), and more specifically, to methods and apparatuses for transmitting a DRS for a communication system operating in an unlicensed band.

BACKGROUND ART

In an NR-U system operating in an unlicensed spectrum to increase network capacity by increasing utilization of limited frequency resources, terminals can determine whether a base station (e.g., gNB) transmits a signal or not based on a discovery reference signal (DRS) transmitted from the base station as in a general NR system. The NR-U system also should comply with regulations on a transmission band, a transmission power, and a transmission time according to the use of the unlicensed band even for the transmission of the DRS. In particular, when a signal is transmitted in the unlicensed band, the transmission signal should be configured and transmitted to occupy 80% of the total channel bandwidth (e.g., 20 MHz) according to an occupied channel bandwidth (OCB) regulation. In addition, in the case of the NR-U system, a List-Before-Talk (LBT) procedure should be performed before transmitting the DRS in order to coexist with other systems according to the characteristics of the unlicensed band.

Therefore, in the NR-U system, unlike transmission of synchronization signal/physical broadcast channel (SS/PBCH) blocks of the general NR system, there is a problem that it is difficult to predict an actual transmission time of the DRS transmission, and system information or a reference signal should be transmitted as multiplexed with the SS/PBCH block within the DRS in order to comply with the OCB regulation.

DISCLOSURE

Technical Problem

An objective of the present invention for solving the above-described problem is directed to providing a method for transmitting and receiving a discovery reference signal in a mobile communication system operating in an unlicensed band.

Another objective of the present invention for solving the above-described problem is directed to providing an apparatus for transmitting and receiving a DRS in a mobile communication system operating in an unlicensed band.

Yet another objective of the present invention for solving the above-described problem is directed to providing a method and an apparatus for performing a random access by referring to a DRS in a mobile communication system operating in an unlicensed band.

Technical Solution

An exemplary embodiment of the present invention for achieving the objective, as an operation method of a terminal for receiving a DRS, may comprise receiving an SS/PBCH block included in a DRS; identifying at least one monitoring occasion for a PDCCH for reception of remaining system information (RMSI) based on a PBCH included in the SS/PBCH block; detecting the PDCCH for reception of the RMSI by monitoring the at least one monitoring occasion; and receiving a PDSCH including the RMSI based on the detected PDCCH, wherein the at least one monitoring occasion is configured in at least one symbol among symbols before the PDSCH and symbols after the PDSCH.

The at least one monitoring occasion may be configured in one symbol before the PDSCH and one symbol after the PDSCH.

The at least one monitoring occasion may be configured in two symbols before the PDSCH.

The at least one monitoring occasion may be configured in two symbols after the PDSCH.

The at least one monitoring occasion is configured by the PBCH included in the SS/PBCH block, and a payload of the PBCH may be maintained without change even when a transmission time point of the SS/PBCH block within the DRS is changed.

Whether the PBCH configures one monitoring occasion or a plurality of monitoring occasions may be configured using at least one of a radio resource control (RRC) signaling, MAC control element (CE), and downlink control information (DCI).

Another exemplary embodiment of the present invention for achieving the objective, as an operation method of a terminal for receiving a DRS, may comprise receiving a first synchronization signal/physical broadcast channel (SS/PBCH) block included in a first DRS; identifying at least one monitoring occasion of a physical downlink control channel (PDCCH) for receiving remaining system information (RMSI) based on a PBCH included in the received first SS/PBCH block; detecting the PDCCH for receiving the RMSI by monitoring the at least one monitoring occasion; determining whether a candidate transmission resource region of the first SS/PBCH block or a candidate transmission resource region of a second SS/PBCH block overlaps a resource region of a physical downlink shared channel (PDSCH) for receiving the RMSI based on indication information included in the detected PDCCH; and in response to determining that the candidate transmission resource region of the first SS/PBCH block or the candidate transmission resource region of the second SS/PBCH block overlaps the resource region of the PDSCH, decoding the PDSCH through rate-matching under assumption that the PDSCH is not mapped to the candidate transmission resource region of the first SS/PBCH block or the candidate transmission resource region of the second SS/PBCH block.

The indication information may be configured as one bit, and indicate whether the candidate transmission resource region of the second SS/PBCH block overlaps the resource region of the PDSCH for receiving the RMSI.

The candidate transmission resource region of the second SS/PBCH block may be a resource region belonging to a same slot together with the candidate transmission resource region of the first SS/PBCH block.

When a slot includes M (M is a natural number equal to or greater than 2) SS/PBCH block candidate transmission resource regions, the indication information may be configured as M bits, and indicate whether each of the M resource regions including the candidate transmission resource region of the first SS/PBCH block and the candidate transmission resource region of the second SS/PBCH block overlaps the resource region of the PDSCH for receiving the RMSI.

When a slot includes M (M is a natural number equal to or greater than 2) SS/PBCH block candidate transmission resource regions, the indication information may be configured as (M−1) bits, and indicate whether each of (M−1) resource regions including the candidate transmission resource region of the second SS/PBCH block overlaps the resource region of the PDSCH for receiving the RMSI.

Yet another exemplary embodiment of the present invention for achieving the objective, as an operation method of a terminal for receiving a DRS, may comprise receiving, from a base station, first information on a position where a DRS starts to be actually transmitted by the base station and second information on a number of DRSs continuously transmitted by the base station; and receiving data from the base station based on positions of resources in which the DRS is actually transmitted, which is identified based on the first information and the second information.

The information on the position where the DRS starts to be actually transmitted may be an index of the position where the DRS starts to be actually transmitted among L (L is a natural number) DRS candidate positions.

The length of information into which the first information and the second information are combined may be shorter than L.

The first information is received through a PDCCH for reception of RMSI, the second information is received through the RMSI, and the RMSI may not be changed according to a change of the first information.

An exemplary embodiment of the present invention for achieving another objective, as an operation method of a terminal for performing a random access in an unlicensed band mobile communication system, may comprise receiving a first discovery reference signal (DRS) from a base station; determining an index of a synchronization signal/physical broadcast channel (SS/PBCH) block included in the first DRS based on a result of a modulo operation (A, Q) of a sequence index (A) of a demodulation reference signal (DMRS) of a PBCH of the SS/PBCH block included in the first DRS or an index (A) of a candidate position of the SS/PBCH block, and a value (Q) signaled from the base station; and performing a random access to the base station using at least one random access occasion corresponding to the determined index of the SS/PBCH block.

A plurality of random access occasions corresponding to the determined index of the SS/PBCH block may be configured.

The first DRS may share the at least one random access occasion with a second DRS including an SS/PBCH block having a same index as the determined index of the SS/PBCH block.

The SS/PBCH block of the first DRS and the SS/PBCH block of the second DRS may be received through a same beam.

The SS/PBCH block of the first DRS may have a Quasi-Co-Located (QCL) relation with the SS/PBCH block of the second DRS.

The value (Q) is signaled through a content of the PBCH included in the SS/PBCH block or remaining system information (RMSI).

A monitoring occasion of a control channel for receiving other system information, which corresponds to the determined index of the SS/PBCH block, and/or a monitoring occasion of a control channel for receiving paging information, which corresponds to the determined index of the SS/PBCH block, may be configured.

Another exemplary embodiment of the present invention for achieving another objective, as an operation method of a base station for supporting a random access of a terminal in an unlicensed band mobile communication system, may comprise transmitting a first discovery reference signal (DRS) to a terminal; and receiving a physical random access channel (PRACH) preamble from the terminal through at least one random access occasion, wherein an index of a synchronization signal/physical broadcast channel (SS/PBCH) block included in the first DRS is determined based on a result of a modulo operation (A, Q) of a sequence index (A) of a demodulation reference signal (DMRS) of a PBCH of the SS/PBCH block included in the first DRS or an index (A) of a candidate position of the SS/PBCH block, and a value (Q) configured by the base station to the terminal, and the at least one random access occasion corresponds to the determined index of the SS/PBCH block.

A plurality of random access occasions corresponding to the determined index of the SS/PBCH block may be configured.

The first DRS may share the at least one random access occasion with a second DRS including an SS/PBCH block having a same index as the determined index of the SS/PBCH block.

The SS/PBCH block of the first DRS and the SS/PBCH block of the second DRS may be transmitted through a same beam.

The SS/PBCH block of the first DRS may have a Quasi-Co-Located (QCL) relation with the SS/PBCH block of the second DRS.

The value (Q) may be signaled to the terminal through a content of the PBCH included in the SS/PBCH block or remaining system information (RMSI).

A monitoring occasion of a control channel for receiving other system information, which corresponds to the determined index of the SS/PBCH block, and/or a monitoring occasion of a control channel for receiving paging information, which corresponds to the determined index of the SS/PBCH block, may be configured.

Advantageous Effects

According to the exemplary embodiments of the present invention as described above, the DRS can be reliably transmitted and received in the NR-U system. In addition, since information on the positions where the DRS is actually transmitted among the candidate positions of the DRS is transferred from the base station to the terminal, the terminal can reliably receive data from the base station based on the transferred information.

DESCRIPTION OF DRAWINGS

FIG. 15 is a conceptual diagram for describing a method of representing actual transmission positions of SS/PBCH blocks according to another exemplary embodiment of the present invention.

MODES OF THE INVENTION

Figure 1:
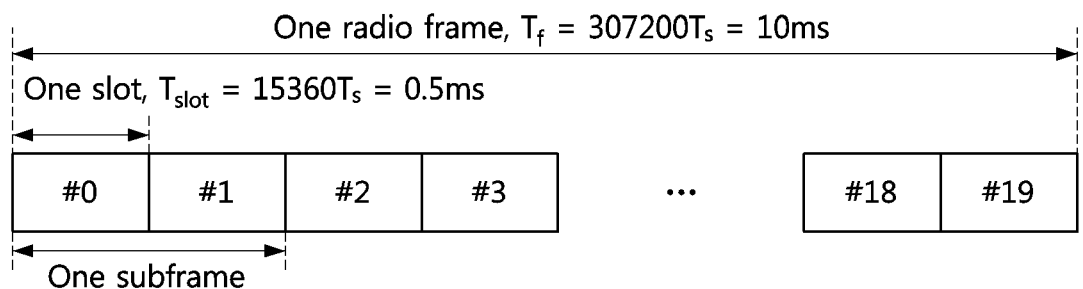
FIG. 1 is a conceptual diagram illustrating a type 1 frame structure in the LTE system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings.

The 3GPP Long Term Evolution (LTE) system, which is one of the conventional mobile communication technologies, supports three types of frame structures. The first is a type 1 frame structure applicable to Frequency Division Duplex (FDD), the second is a type 2 frame structure applicable to Time Division Duplex (TDD), and the last is a type 3 frame structure for transmission in an unlicensed frequency band.

FIG. 1 is a conceptual diagram illustrating a type 1 frame structure in the LTE system.

Referring to FIG. 1, one radio frame may have a length of 10 ms (307,200$T_s$), and comprise 10 subframes. Here, $T_s$ is a sampling time and has a value of 1/(15 kHz×2048). Each subframe has a length of 1 ms, and one subframe includes two slots each having a length of 0.5 ms. One slot consists of seven OFDM symbols in case of a normal CP and six OFDM symbols in case of an extended CP.

Figure 2:
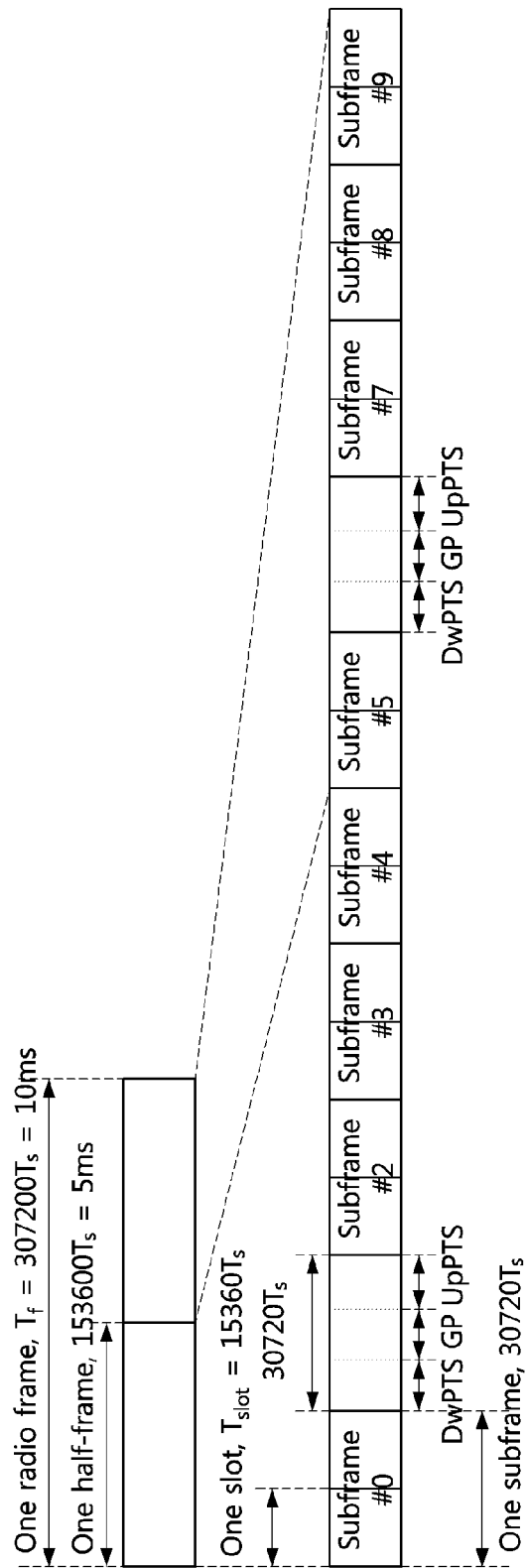
FIG. 2 is a conceptual diagram illustrating a type 2 frame structure in the LTE system.

FIG. 2 is a conceptual diagram illustrating a type 2 frame structure in the LTE system.

Referring to FIG. 2, the relationship among a radio frame, subframes, and slots, and their lengths are the same as in the case of type 1. As a difference, one radio frame may be composed of downlink subframe(s), uplink subframe(s), and special subframe(s). The special subframe(s) may exist between a downlink subframe and an uplink subframe, and may include a Downlink Pilot Time Slot (DwPTS), a Guard Period (GP), and an Uplink Pilot Time Slot (UpPTS). One radio frame may include two special subframes when a downlink-uplink switching periodicity is 5 ms, and one special subframe when the downlink-uplink switching periodicity is 10 ms. The DwPTS may be used for cell search, synchronization, or channel estimation, and the GP may be a period for removing interference generated in uplink of a base station due to a multipath delay difference of terminals. In the UpPTS, a Physical Random Access Channel (PRACH) or a Sounding Reference Signal (SRS) may be transmitted.

In the LTE system, a Transmission Time Interval (TTI) means a basic time unit in which an encoded data packet is transmitted through a physical layer signal. The LTE release 14 defines short TTI-based data transmission to meet low latency requirements. To distinguish the TTI up to release 14 from the short TTI, the TTI up to release 14 may be referred to as a 'base TTI' or 'regular TTI'.

The base TTI of the LTE system consists of one subframe. That is, a time axis length of a Physical Resource Block (PRB) pair, which is a minimum unit of resource allocation, is 1 ms. In order to support transmission of the 1 ms TTI, physical signals and channels are also mostly defined on a subframe basis. For example, a Cell-specific Reference Signal (CRS), a Physical Downlink Control Channel (PDCCH), a Physical Downlink Shared Channel (PDSCH), a Physical Uplink Control Channel (PUCCH) and a Physical Uplink Shared Channel (PUSCH) may exist for each subframe. On the other hand, a Primary Synchronization Signal (PSS) and a Secondary Synchronization Signal (SSS) may be present in every fifth subframe, and a Physical Broadcast Channel (PBCH) may be present in every tenth subframe. Meanwhile, one radio frame consists of 10 subframes and has a time axis length of 10 ms. The radio frame is identified by a System Frame Number (SFN), which is used to define transmission of a signal (e.g., paging, channel estimation reference signal, channel state information reporting) having a transmission periodicity longer than one radio frame. A periodicity of the SFN is 1024.

In the LTE system, the PBCH is a physical layer broadcast channel that conveys the most essential system information called a Master Information Block (MIB). The PBCH is transmitted every tenth subframe and is transmitted once in one radio frame. The MIB should be transmitted with the same information during four radio frames, after which it may change depending on the situation of the system. This is called a PBCH TTI (=40 ms) for convenience. In this case, the transmitted MIB includes 3 bits indicating a system band, 3 bits related to a Physical Hybrid ARQ Indicator Channel (PHICH), 8 bits for the SFN, 10 bits reserved for future use, and 16 bits for a cyclic redundancy check (CRC). That is, the MIB is comprised of a total of 40 bits. The SFN identifying the radio frame consists of a total of 10 bits (B9~B0), and only 8 bits (B9~B2) that are most significant bits (MSB) of the SFN are transmitted through the PBCH. Accordingly, the information on the corresponding SFN, which is transmitted through the PBCH, is not changed during four radio frames. The remaining 2 bits (B1~B0) that are least significant bits (LSB) of the SFN changing during four radio frames are implied through a scrambling sequence used for the PBCH without being explicitly given by the MIB transmitted through the PBCH. As the scrambling sequence of the PBCH, a gold sequence generated by being initialized with a cell identifier (ID) is used, and the PBCH scrambling sequence is newly initialized by an equation of mod (SFN, 4) with a periodicity of four radio frames. Therefore, a gold sequence, which is newly generated by being initialized with a cell ID for each radio frame whose LSB 2-bits of the SFN is '00', is applied as the scrambling sequence. Gold sequences, which are generated successively thereafter, are used for PBCH scrambling in radio frames whose 2 bits of the SFN ends with '01', '10', and '11'. Accordingly, the terminal acquiring a cell ID during an initial cell search may implicitly identify information on '00', '01', '10', or '11' of the LSB 2 bits of the SFN through the scrambling sequence during the PBCH decoding. The terminal may finally identify 10 bits (B9~B0) of the SFN by combining two bits (B1~B0) obtained through the scrambling sequence and 8 bits (B9~B2) obtained explicitly through the PBCH.

The evolved mobile networks after the LTE should meet technical requirements to support a wider range of service scenarios, as well as the high transmission speeds that were previously a major concern. Recently, the ITU-R has defined key performance indicators (KPIs) and requirements for the IMT-2020, the official name for 5G mobile communications. These are summarized as enhanced mobile broadBand (eMBB), ultra reliable low latency communication (URLLC), and massive machine type communication (mMTC). The planned schedule of the ITU-R aims to distribute frequencies for the IMT-2020 in year 2019 and complete international standard approval by year 2020.

The 3GPP is developing 5G standard specifications based on a new radio access technology (RAT) that meets the requirements of IMT-2020. According to the definition of 3GPP, the new radio access technology is a radio access technology that does not have backward compatibility with the legacy 3GPP radio access technology. The new wireless communication system after the LTE adopting such the radio access technology will be referred to herein as a new radio (NR).

One of the features that the NR differs from CDMA or LTE, which is the conventional 3GPP system, is that it utilizes a wide range of frequency bands to increase transmission capacity. In this regard, the WRC-15, which is organized by the ITU, defined an agenda of the next WRC-19, which will review 24.25 to 86 GHz band as a candidate frequency band for the IMT-2020. The 3GPP considers the sub-1 GHz band to the 100 GHz band as candidate bands for the NR.

As waveform technologies for the NR, candidates such as orthogonal frequency division multiplexing (OFDM), filtered OFDM, generalized frequency division multiplexing (GFDM), filter bank multi-carrier (FBMC), and universal filtered multi-carrier (UFMC) are being discussed. Although there are advantages and disadvantages, cyclic prefix (CP) based OFDM and single carrier-frequency division multiple access (SC-FDMA) are still effective schemes for 5G systems due to the relatively low implementation complexity and multiple-input multiple-output (MIMO) scalability. However, in order to flexibly support various 5G usage scenarios, a method of simultaneously accommodating various waveform parameters in one carrier without guard bands may be considered. To this end, the filtered OFDM, the GFDM, or the like having a frequency spectrum with low out of band emission (OOB) may be suitable.

In the present invention, for convenience of description, it is assumed that the CP-based OFDM (CP-OFDM) is a waveform technology for wireless access. However, this is merely for convenience of description, and the scope of the claims of the present invention is not limited to a specific waveform technology. In general, the category of CP-based OFDM technology includes the filtered OFDM or the spread spectrum OFDM (e.g., DFT-spread OFDM) technology.

One of the biggest factors determining a subcarrier spacing of an OFDM system is a carrier frequency offset (CFO) experienced by a receiver, which is characterized by an increase in proportion to an operating frequency due to a Doppler effect and a phase drift. Therefore, in order to prevent performance degradation due to the carrier frequency offset, the subcarrier spacing should increase in proportion to the operating frequency. On the other hand, if the subcarrier spacing is too large, there is a disadvantage that the CP overhead increases. Therefore, the subcarrier spacing should be defined as an appropriate value considering channel and RF characteristics for each frequency band.

Various numerologies are considered in the NR system. For example, the subcarrier spacing of 15 kHz, which is the subcarrier spacing of the conventional LTE, and the subcarrier spacings of 30 kHz, 60 kHz, and 120 kHz, which respectively are 2, 4, and 8 times scaled, may be considered together. Configuring the differences between the subcarrier spacings of different numerologies by exponential multipliers of 2 may be advantageous for heterogeneous numerology-based carrier aggregation, frame structure design, and multiplexing of heterogeneous numerology within one carrier.

The NR system is expected to be used in a wide range of frequencies ranging from hundreds of MHz to tens of GHz. In general, since the diffraction and reflection characteristics of radio waves are not good at high frequencies, propagation characteristics are generally not good, and propagation losses such as path loss and reflection loss are known to be relatively large compared to those of the low frequencies. Therefore, when the NR system is deployed in the high frequency, cell coverage may be reduced as compared with the legacy low frequency. In order to solve this problem, a method of increasing cell coverage through beamforming using a plurality of antenna elements may be considered at high frequency.

The beamforming schemes may include an analog beamforming scheme and a digital beamforming scheme. The digital beamforming scheme may obtain a beamforming gain by using a plurality of radio frequency (RF) paths based on multiple input multiple output (MIMO) and a digital precoder or a codebook. The analog beamforming scheme may obtain a beamforming gain through an antenna array and a number of analog and RF devices such as phase shifters, power amplifiers (PAs), and variable gain amplifiers (VGAs). Since the digital beamforming scheme requires a digital-to-analog converter (DAC) or an analog-to-digital converter (ADC) and requires the same number of transceiver units (TXRUs) as antenna elements, increase of the beamforming gain proportionally increases the complexity of the antenna implementation as well. In the analog beamforming scheme, since a plurality of antenna elements are connected to a single transceiver unit through phase shifters, even when the number of antenna elements is increased in order to increase the beamforming gain, the resulting complexity is not greatly increased. However, the performance of the analog beamforming scheme is lower than that of the digital beamforming scheme, and the frequency resource utilization efficiency is limited because the phase shifters are controlled in time domain. Therefore, a hybrid beamforming scheme, which is a combination of the analog scheme and the digital scheme, may be used.

In the case that the cell coverage is increased through the beamforming, not only dedicated control channels and dedicated data for each terminal in the cell but also common control channels and common signals for all terminals in the cell may be also transmitted in the beamforming manner. When the common control channels and signals are transmitted to all terminals by applying the beamforming to increase the cell coverage, since the common control channels and signals cannot be transmitted to all the regions in the cell through a single transmission, they may be transmitted through a plurality of beams over a plurality of times for a predetermined time. Transmitting multiple times by switching multiple beams is called beam sweeping. Such the beam sweeping operation is necessarily required when transmitting common control channels and signals using the beamforming.

A terminal accessing the system acquires downlink frequency/time synchronization and a cell ID through a synchronization signal (SS), acquires uplink synchronization through a random access procedure, and establishes a link. In this case, in the NR system, TDM-based multiplexing of an NR-SS and an NR-PBCH which are periodically transmitted is supported, and they are transmitted using N(=4) OFDM symbols. These N OFDM symbols are defined as an SS block (SSB). In case of transmitting the SSBs using beamforming, a beam sweeping operation that transmits multiple beams while switching the multiple beams is required. For this, a plurality of SSBs may be defined within a transmission period of the NR-SS and the NR-PBCH, and the plurality of SSBs configured as described above are assembled into an SS burst set.

Figure 3:
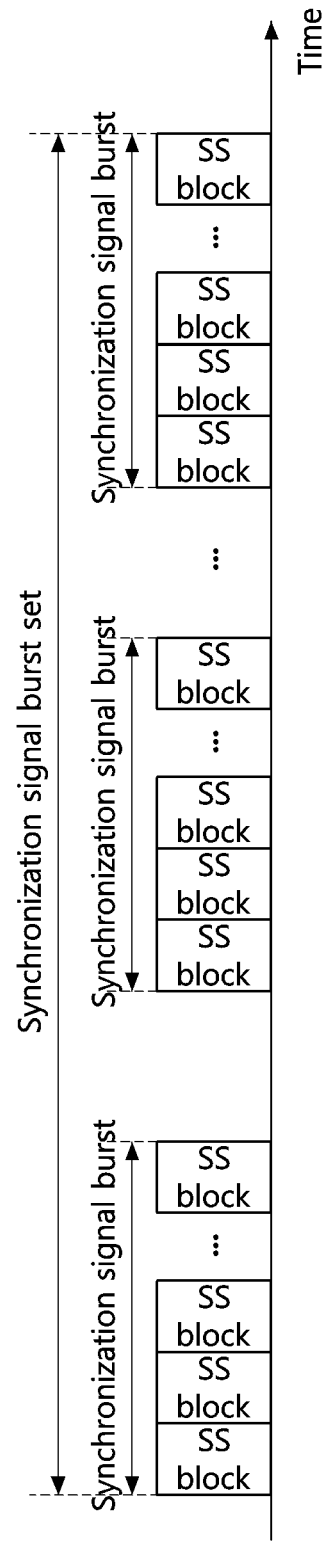
FIG. 3 is a conceptual diagram for describing transmission of an SS burst set in an NR system.

FIG. 3 is a conceptual diagram for describing transmission of an SS burst set in an NR system.

Referring to FIG. 3, an SS burst set is repeated periodically. According to a periodicity of the SS burst set, the base station transmits SSBs to the terminals in the cell through different beams in a beam sweeping manner. The maximum number L of SSBs constituting one SS burst set and the locations of the L SSBs are defined in the specification, and L may have a different value according to a system frequency region. The number and locations of SSBs actually transmitted among the L SSBs may be determined by a network.

Figure 4:
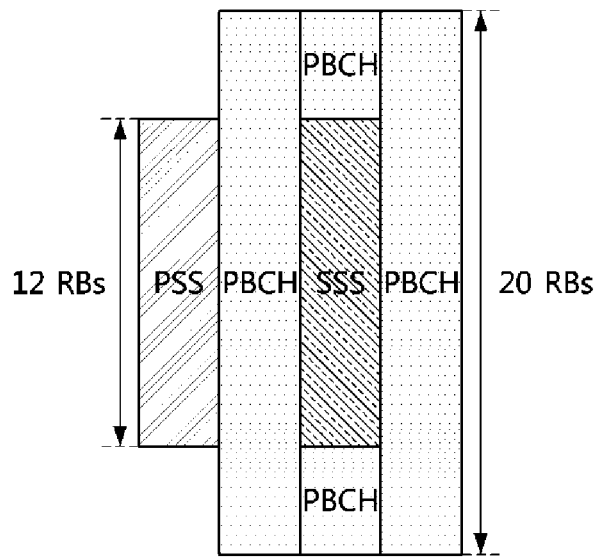
FIG. 4 is a conceptual diagram for describing a synchronization signal block configuration of an NR system.

FIG. 4 is a conceptual diagram for describing a synchronization signal block configuration of an NR system.

Referring to FIG. 4, signals and a channel are time division multiplexed in one SSB in the order of PSS, PBCH, SSS, and PBCH, and the PBCH may be transmitted in both end bands adjacent to the frequency band in which the SSS is transmitted. Also, an SSB index may be identified through a PBCH DMRS when the maximum number L of SSBs is 8 in the sub 6 GHz frequency band. When the maximum number L of SSBs is 64 in the over 6 GHz frequency band, LSB 3 bits of 6 bits representing the SSB index is identified through the PBCH DMRS, and the remaining MSB 3 bits are transmitted through a payload of the PBCH, which are identified by performing decoding on the PBCH.

The NR system can support a system bandwidth of up to 400 MHz, but in case of a terminal, the size of bandwidth that can be supported may vary according to the capability of the terminal. Therefore, some terminals accessing the wideband system can access only part of the entire band of the system. In order to facilitate connection of terminals supporting various bandwidths in a system supporting such a wide bandwidth, unlike the conventional LTE, which always transmits synchronization signals and PBCHs at the center of the system bandwidth, the NR system may transmit SSBs in multiple locations in the frequency axis.

Figure 5:
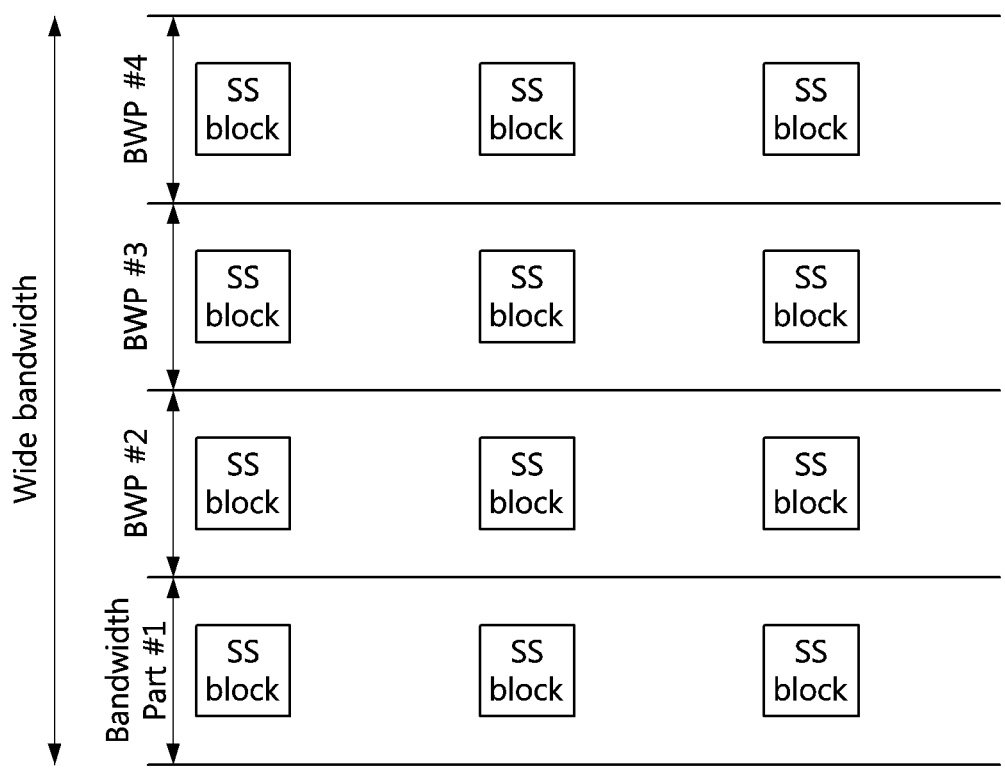
FIG. 5 is a conceptual diagram for describing an example of dividing a wideband component carrier (CC) into a plurality of bandwidth parts (BWP) and transmitting SSBs in each BWP in an NR system.

FIG. 5 is a conceptual diagram for describing an example of dividing a wideband component carrier (CC) into a plurality of bandwidth parts (BWP) and transmitting SSBs in each BWP in an NR system.

Referring to FIG. 5, a terminal may perform initial access using one of SSBs transmitted through each BWP. After detecting of an SSB, the terminal may perform a cell access procedure by acquiring Remaining Minimum System Information (RMSI), and the RMSI may be transmitted in a PDSCH through scheduling by a PDCCH. In this case, configuration information of a Control Resource Set (CORESET) in which the PDCCH containing scheduling information of a RMSI PDSCH is transmitted is transmitted through a PBCH in the SSB. When multiple SSBs are transmitted in the entire system band, some SSBs may have RMSIs associated therewith, and some SSBs may not have RMSIs associated therewith. In this case, the SSB having the associated RMSI is defined as a 'cell defining SSB', and the cell search and initial access procedure of the terminal may be performed only through the 'cell defining SSB'. The SSBs not having the associated RMSI may be used for performing synchronization or measurement in the corresponding BWP. In this case, the BWP in which the SSB is transmitted may be limited to some of several BWPs in the wideband.

As described above, the reception of RMSI is performed through a series of processes of detecting a PDCCH through the CORESET configuration information transmitted through a PBCH, obtaining scheduling information of an RMSI from the PDCCH, and receiving a PDSCH accordingly. In this case, a control channel resource region through which the PDCCH can be transmitted is configured through RMSI CORESET configuration information, which may have three patterns as follows.

Figure 6:
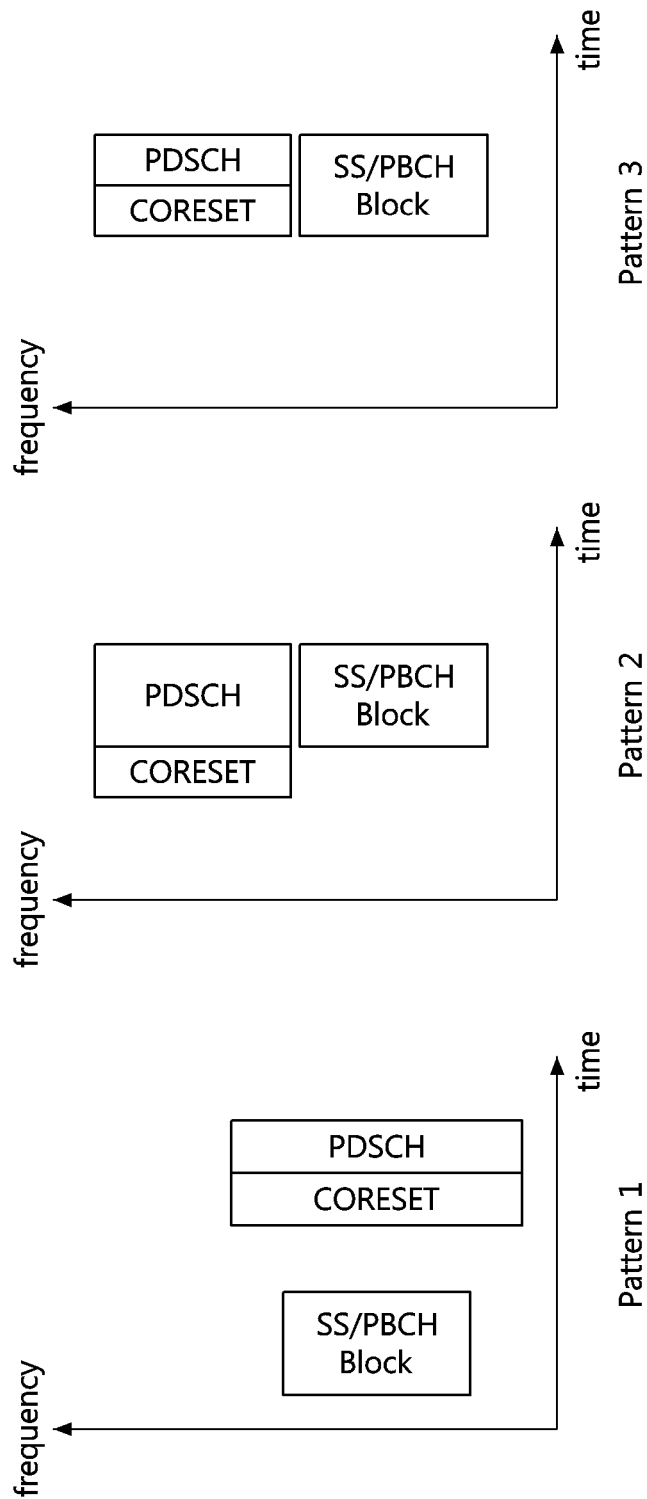
FIG. 6 is a conceptual diagram for describing three basic patterns for configuring an RMSI CORESET in an NR system.

FIG. 6 is a conceptual diagram for describing three basic patterns for configuring an RMSI CORESET in an NR system.

In order to configure an RMSI CORESET, one of three patterns shown in FIG. 6 is selected, and detailed configuration is completed in the selected pattern. In the pattern 1, SSB, RMSI CORESET, and RMSI PDSCH are all TDMed. In the pattern 2, RMSI CORESET and RMSI PDSCH are TDMed, and only RMSI PDSCH is frequency division multiplexed (FDMed) with SSB. In the pattern 3, RMSI CORESET and RMSI PDSCH are TDMed, and both RMSI CORESET and RMSI PDSCH are FDMed with SSB. Only the pattern 1 can be used in the frequency band below 6 GHz, and the patterns 1, 2, and 3 can be used in the frequency band above 6 GHz. Also, the numerologies used for SSB, RMSI CORESET, and RMSI PDSCH may differ. For the pattern 1, all combinations of numerologies can be used. For the pattern 2, only combinations of {SSB, RMSI}, which include {120 kHz, 60 kHz} and {240 kHz, 120 kHz}, can be used. For the pattern 3, only a combination of (SSB, RMSI), which is {120 kHz, 120 kHz}, can be used.

The RMSI CORESET configuration information selects one of the three patterns according to a combination of numerologies for SSB and RMSI. The RMSI CORESET configuration information may be configured using Table A representing the number of resource blocks (RBs) of the RMSI CORESET, the number of symbols of the CORESET, and information on an offset between an RB of the SSB and an RB of the RMSI CORESET, and Table B representing the number of search space sets per slot for each pattern and information for configuring a monitoring occasion of RMSI PDCCH such as a CORESET offset, an OFDM symbol index, and the like. Each of Tables A and B actually consists of several tables (Table A: Table 13-1 to Table 13-8, Table B: Table 13-9 to Table 13-13). The RMSI CORESET configuration information is configured with 4 bits from each of Tables A and B, and represents information of 8 bits.

As NR phase 1 standardization has been finalized in 3GPP release 15 and phase 2 standardization is proceeding in release 16, new features for the NR system are being discussed. The representative one among them is NR-Unlicensed (NR-U). The NR-U is a technology to support operations in an unlicensed spectrum used in communication systems such as Wi-Fi to increase network capacity by increasing utilization of limited frequency resources. The 3GPP communication system for operations in an unlicensed band has begun standardization with Licensed-Assisted Access (LTE-LAA) technology in 3GPP release 13, and has continued to evolve to release 14 'Enhanced LAA (LTE-eLAA)' and release 15 'Further Enhanced LAA (LTE-FeLAA)'. Also in the NR, a standardization work is proceeding through a work item (WI) in the release 16 started from a study item (SI) for the NR-U.

In the NR-U, similarly to the general NR system, terminals can determine whether a base station (e.g., gNB) transmits a signal based on a discovery reference signal (DRS) transmitted from the base station. In particular, in the NR-U of a stand-alone (SA) mode, the terminal may acquire synchronization and system information through the DRS. In the NR-U system, the transmission of the DRS should comply with the regulation for the use of the unlicensed band (e.g., transmission band and transmission power, and transmission time). In particular, when a signal is transmitted in the unlicensed band, the transmission signal should be configured and transmitted to occupy 80% of the total channel bandwidth (e.g., 20 MHz) according to the occupied channel bandwidth (OCB) regulation.

In addition, in the case of the NR-U, a Listen-Before-Talk (LBT) procedure should be performed for coexistence with other systems due to the characteristics of the unlicensed band in order to transmit a signal and data as well as the DRS. The LBT procedure is a procedure for identifying whether another base station, another terminal, or another system is transmitting a signal before transmitting a signal. The base station or terminal of the NR-U system may determine whether a signal is transmitted or not for a predetermined time period through the LBT procedure, and may transmit its own signal when it is determined that no signal is transmitted. When the LBT procedure fails, the base station or terminal may not transmit a signal. Depending on the type of signal to be transmitted, various categories of LBT procedures may be performed before transmission of the corresponding signal.

RMSI PDCCH Monitoring in DRS Transmission

The DRS of the NR-U may basically include a synchronization signal block (SSB) (i.e., a synchronization signal/physical broadcast channel (SS/PBCH) block) of the NR for synchronization acquisition and channel measurement. Hereinafter, the SS/PBCH block and the SSB have the same meaning. As described above, the OCB regulation should also be satisfied when transmitting the DRS. Since the SS/PBCH block of the legacy NR is composed of up to 20 resource blocks (RBs), the SS/PBCH block occupies a 3.6 MHz band when the subcarrier spacing is 15 kHz, and the SS/PBCH block occupies a 7.2 MHz band when the subcarrier spacing is 30 kHz. Therefore, in order to transmit in accordance with the OCB regulation, signals/channels other than the SS/PBCH block may be multiplexed and transmitted together in the DRS.

In case of the NR-U in the SA mode, remaining system information (RMSI), which is essential system information, may be multiplexed and transmitted together with the SS/PBCH block. In case of the NR-U in a non-standalone (NSA) mode, since system information is transmitted from an existing primary cell (i.e., primary cell operating in a licensed band), the system information may not need to be transmitted separately in an unlicensed band. Therefore, in the NR-U in the NSA mode, a channel state information reference signal (CSI-RS) or a tracking-reference signal (T-RS) for channel measurement may be multiplexed and transmitted with the SS/PBCH block instead of the system information. On the other hand, in the SA mode, the CSI-RS or the T-RS may be multiplexed with the SS/PBCH block instead of the system information, and in the NSA mode, the system information may be multiplexed with the SS/PBCH block instead of the CSI-RS or T-RS. In the following exemplary embodiments according to the present invention, regardless of the mode (i.e., SA mode or NSA mode), when the DRS in which the SS/PBCH block and the system information are multiplexed is transmitted, a method for monitoring a PDCCH including scheduling information of the system information according to the LBT procedure will be proposed.

As described above, in the NR-U, the LBT procedure should be performed before DRS transmission. When the LBT procedure fails, the DRS cannot be transmitted. Therefore, a DRS structure is needed to provide a lot of opportunities for performing the LBT procedure.

Figure 7:
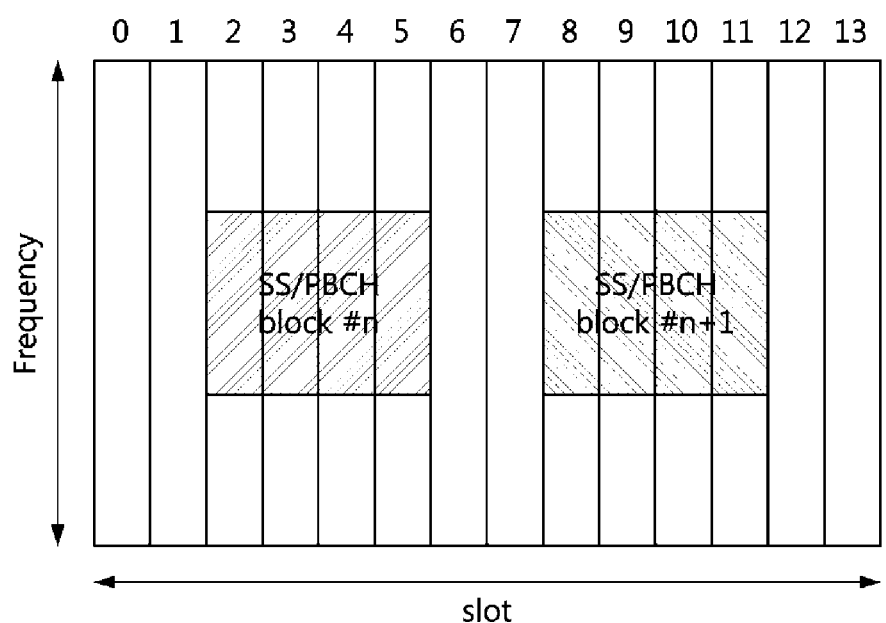
FIGS. 7 and 8 are conceptual diagrams illustrating a structure for transmitting up to two SS/PBCH blocks within one slot in an NR system.
Figure 8:
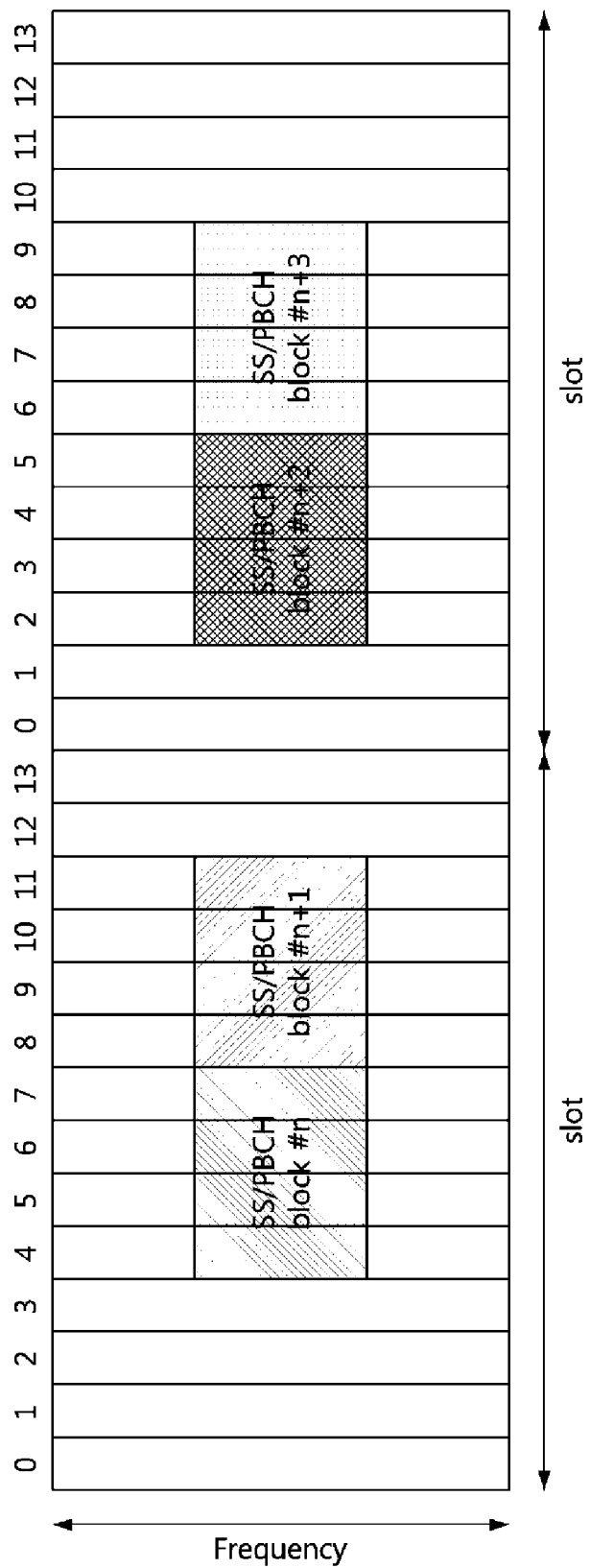

FIGS. 7 and 8 are conceptual diagrams illustrating a structure for transmitting up to two SS/PBCH blocks within one slot in an NR system.

When the subcarrier spacing of 15 kHz or 30 kHz is used, SS/PBCH blocks may be transmitted using a structure shown in FIG. 7. When the subcarrier spacing of 30 kHz is used, SS/PBCH blocks may be transmitted using a structure shown in FIG. 8. When SS/PBCH blocks need to be additionally transmitted, a plurality of SS/PBCH blocks may be transmitted using the structure of FIG. 7 or 8 continuously according to the subcarrier spacing.

In the NR-U, when the DRS is configured to include the SS/PBCH block and the RMSI, a PDSCH and a PDCCH for reception of the RMSI may be transmitted through a resource region around the SS/PBCH block to satisfy the OCB regulation.

Figure 9:
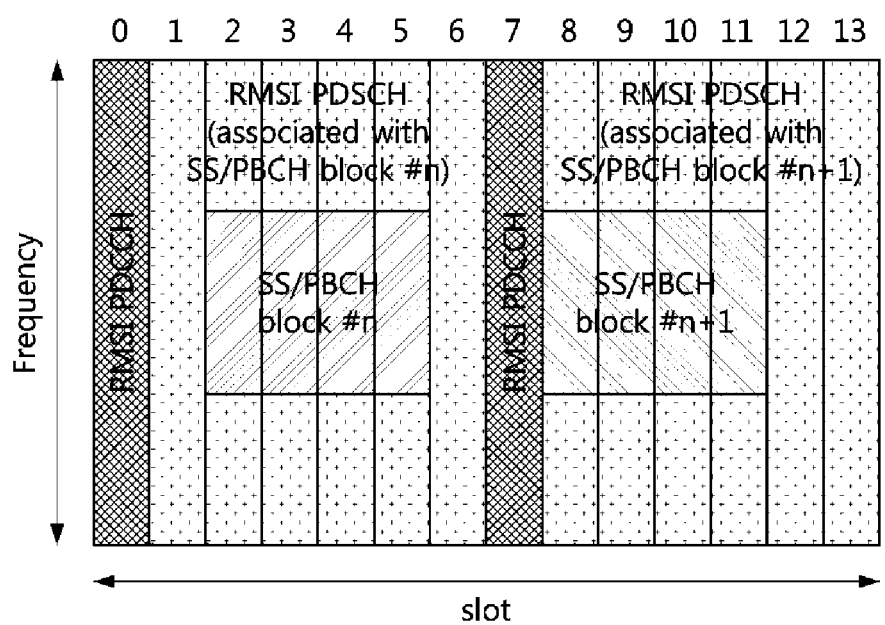
FIG. 9 is a conceptual diagram for describing a structure of a DRS in an NR-U system.

FIG. 9 is a conceptual diagram for describing a structure of a DRS in an NR-U system.

A structure shown in FIG. 9 is an example in which a DRS is configured by multiplexing an SS/PBCH block and an RMSI associated with the SS/PBCH block. This case is an example in which a PDCCH and a PDSCH for reception of the RMSI are multiplexed in a time division duplex (TDM) scheme. In general, since data can be received according to scheduling information, a PDCCH including scheduling information for data is located at a symbol preceding a PDSCH including the corresponding data. In the example shown in FIG. 9, the PDCCH occupies one OFDM symbol. However, depending on configuration, the PDCCH may occupy various numbers of OFDM symbols, and the OFDM symbols occupied by the PDCCH may be other symbols than the 0-th and 7-th symbols. In addition, in the above example, the number of symbols for transmission of the PDSCH including the RMSI is configured as six within each slot, but may be configured as fewer or more than six.

As described above, in the NR-U, the LBT procedure should be performed before transmitting the DRS. When the LBT procedure fails, the DRS cannot be transmitted. Therefore, it is preferable to design the DRS structure so that there are many opportunities to attempt the LBT procedure. In the example shown in FIG. 9, when the LBT procedure succeeds before an OFDM symbol #0 of the slot, all DRSs within the slot may be transmitted. However, when the LBT procedure fails before the OFDM symbol #0 of the slot and succeeds before an OFDM symbol #7, only a part of the DRSs within the slot may be transmitted. Of course, even in this case, a DRS of another slot may be continuously transmitted, but a transmission time of the DRS may be delayed. In this case, if the RMSI PDCCH is transmitted in an ODFM symbol #1 instead of the OFDM symbol #0, the NR-U base station (e.g., gNB) may transmit all the DRSs within the slot when the LBT procedure succeeds only before the OFDM symbol #1. That is, in this case, even when the LBT procedure fails at the position of the OFDM symbol #0, all the DRSs within the slot may be transmitted if the LBT procedure is attempted and succeeds at the position of the OFDM symbol #1. Accordingly, in an exemplary embodiment according to the present invention, the RMSI PDCCH (i.e., PDCCH for reception of the RMSI) may be configured to be located in not only one symbol located before the RMSI PDSCH (i.e., PDSCH for reception of the RMSI) but also another symbol including a symbol located after the RMSI PDSCH, thereby increasing the opportunities for attempting the LBT procedure.

Meanwhile, since a cell search and initial access procedure of the terminal starts with detection of an SS/PBCH block, the base station may periodically transmit the SSBs so that the terminal can perform the cell search and initial access procedure. In this case, the terminal may combine the SS/PBCH blocks periodically transmitted to improve the reception performance of the SSB. To this end, the SS/PBCH blocks periodically transmitted should maintain the same values (i.e., payload) for a certain time period. A CORESET and monitoring occasions (i.e., candidate positions of the PDCCH to be monitored by the terminal to detect the RMSI PDCCH) for transmission of the RMSI PDCCH may be configured through the PBCH included in the SS/PBCH block. Therefore, if the RMSI PDCCH is transmitted before or after the corresponding PDSCH according to whether the LBT procedure succeeds and a time point at which the LBT procedure succeeds as proposed in the above-described exemplary embodiment of the present invention, the values (i.e., payload) of the PBCH configuring the CORESET and monitoring occasions of the PDCCH may be changed, and thus the terminal performing the cell search and initial access procedure cannot combine the SS/PBCH blocks periodically transmitted to improve the reception performance.

Figure 10:
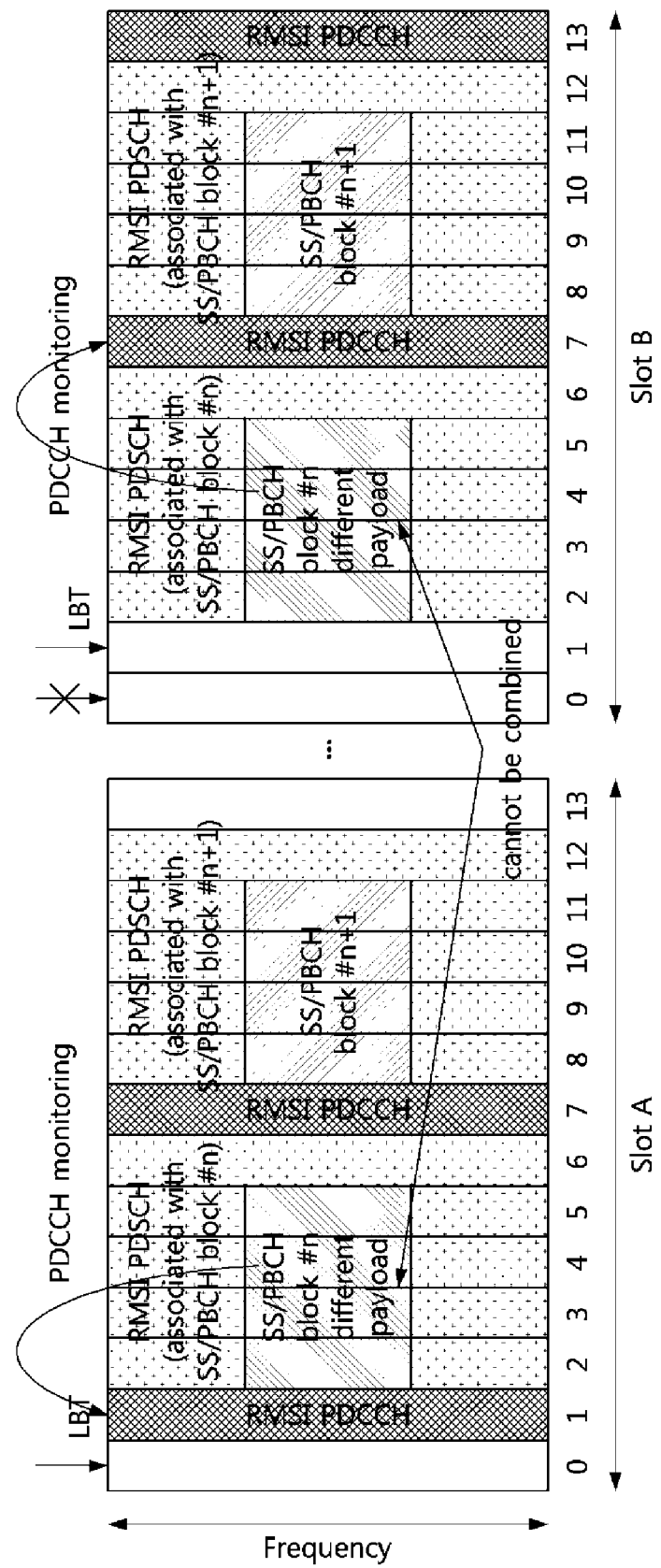
FIG. 10 is a conceptual diagram for describing a problem of PBCH signaling when a position of a RMSI PDCCH monitoring occasion is changed.

FIG. 10 is a conceptual diagram for describing a problem of PBCH signaling when a position of a RMSI PDCCH monitoring occasion is changed.

Referring to FIG. 10, according to whether the LBT procedure succeeds, the RMSI PDCCH may be configured to be located before the corresponding RMSI PDSCH in a slot A, and the RMSI PDCCH may be configured to be located after the corresponding RMSI PDSCH in a slot B after a predetermined period. In this case, the values of the PBCHs (i.e., the values of the PBCHs included in the SSB #n and the SSB #n+1 of the slot A) indicating that the RMSI PDCCH monitoring occasion is located before the corresponding RMSI PDSCH are different from the values of the PBCHs (i.e., the values of the PBCHs included in the SSB #n and the SSB #n+1 of the slot B) indicating that the RMSI PDCCH monitoring occasion is located after the corresponding RMSI PDSCH. Therefore, the receiving terminal cannot combine the PBCHs of the two slots.

Accordingly, an exemplary embodiment of the present invention proposes a method of configuring a plurality of RMSI PDCCH monitoring occasions with single PBCH values, in addition to configuring a single RMSI PDCCH monitoring occasion with single PBCH values. According to the method of configuring a plurality of RMSI PDCCH monitoring occasions with single PBCH values, even when the position of the RMSI PDCCH changes at every transmission time according to whether the LBT procedure succeeds and the time point at which the LBT procedure succeeds, the same PBCH values may be maintained. The terminal in the initial access procedure may improve the reception performance by combining the SS/PBCH blocks including the PBCH.

Figure 11:
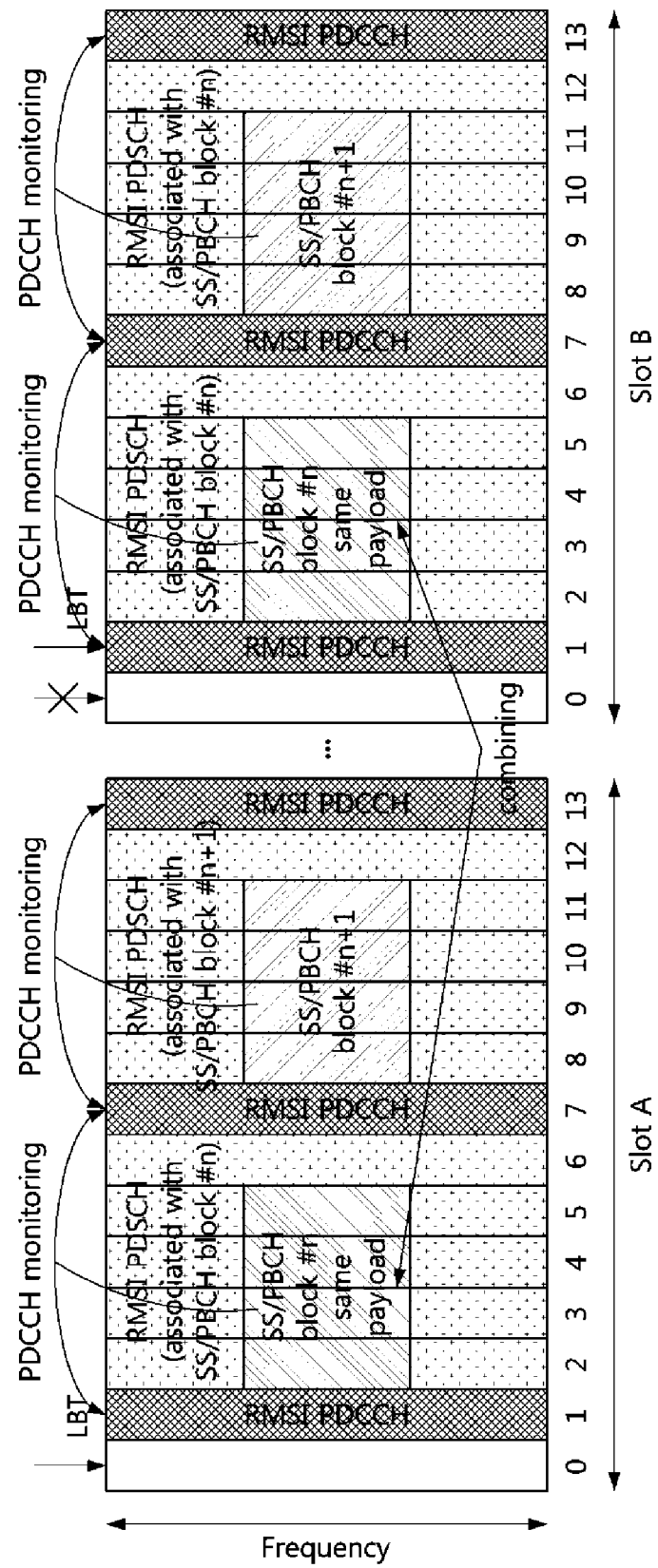
FIG. 11 is a conceptual diagram for describing a method of configuring an RMSI PDCCH monitoring occasion according to an exemplary embodiment of the present invention.

FIG. 11 is a conceptual diagram for describing a method of configuring an RMSI PDCCH monitoring occasion according to an exemplary embodiment of the present invention.

Referring to FIG. 11, the PBCH values indicating the RMSI PDCCH monitoring occasion in the SS/PBCH block #n of the slot A are the same as the PBCH values indicating the RMSI PDCCH monitoring occasion in the SS/PBCH block #n of the slot B. That is, by maintaining the same PBCH payload, the receiving terminal can easily combine two or more PBCHs to obtain improved performance. In addition, a plurality of RMSI PDCCH monitoring occasions may be configured with the single PBCH values that maintain the same payload. That is, the same PBCH values of the SS/PBCH block #n of the slot A and slot B may indicate a plurality of positions (i.e., symbol #1 and symbol #7 in FIG. 11) as the RMSI PDCCH monitoring occasions. In addition, the same PBCH values of the SS/PBCH block #n+1 of the slot A and slot B may indicate a plurality of positions (i.e., symbol #7 and symbol #13 in FIG. 11) as the RMSI PDCCH monitoring occasions. By configuring a plurality of positions as the RMSI PDCCH candidate positions, the constraints of the LBT procedure may be relatively relaxed. That is, the base station may configure a plurality of positions as the candidate transmission positions for transmitting the RMSI PDCCH, and actually transmit the RMSI PDCCH in one of the plurality of positions in consideration of the success position of the LBT procedure, etc.

On the other hand, in the exemplary embodiment shown in FIG. 11, the monitoring occasions of the RMSI PDCCH are configured in the symbol #1, symbol #7, and symbol #13. However, in another exemplary embodiment, the monitoring occasions of the RMSI PDCCH may be configured in other symbols.

Figure 12:
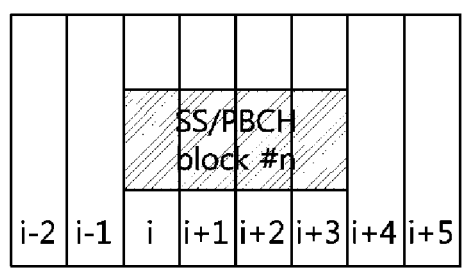
FIG. 12 is another conceptual diagram for describing a method for configuring an RMSI PDCCH monitoring occasion according to an exemplary embodiment of the present invention.

FIG. 12 is another conceptual diagram for describing a method for configuring an RMSI PDCCH monitoring occasion according to an exemplary embodiment of the present invention.

Referring to FIG. 12, the PBCH values of the SSB #n spanning from the i-th symbol to the (i+3)-th symbol may indicate 1) the positions of the (i−1)-th symbol and (i+5)-th symbol as the plurality of RMSI PDCCH monitoring occasions, 2) the positions of the (i−1)-th symbol and (i+4)-th symbol as the plurality of RMSI PDCCH monitoring occasions, 3) the positions of the (i−2)-th symbol and (i+5)-th symbol as the plurality of RMSI PDCCH monitoring occasions, 4) the positions of the (i−2)-th symbol and (i+4)-th symbol as the plurality of RMSI PDCCH monitoring occasions, 5) the positions of the (i−2)-th symbol and (i−1)-th symbol as the plurality of RMSI PDCCH monitoring occasions, or 6) the positions of the (i+4)-th symbol and (i+5)-th symbol as the plurality of RMSI PDCCH monitoring occasions. In addition, although not shown in FIG. 12, even the positions of the (i−3)-th symbol and the (i−2)-th symbol may be indicated as the plurality of RMSI PDCCH monitoring occasions. Regardless of from which symbol to which symbol the SSB is located within one slot, the PBCH values of the SSB may indicate a plurality of symbol positions as the RMSI PDCCH monitoring occasions.

Meanwhile, as a method for configuring the RMSI PDCCH monitoring occasions in a plurality of symbol positions, it may be also possible to configure the plurality of RMSI PDCCH monitoring occasions in three or more symbol positions instead of two symbol positions. For example, in FIG. 12, the PBCH values of the SS/PBCH block #n spanning from the i-th symbol to the (i+3)-th symbol may indicate positions of the (i−3)-th symbol, (i−2)-th symbol, and (i−1)-th symbol as the RMSI PDCCH monitoring occasions.

The example of FIG. 11 expresses that the candidate position (i.e., monitoring occasion) of the RMSI PDCCH may be located before or after the corresponding RMSI PDSCH. That is, the RMSI PDCCH may be actually transmitted only in one of the candidate positions. Therefore, the actual transmission may be performed as shown in FIG. 10. In this case, since the terminal does not know in which of the two candidate positions the RMSI PDCCH is actually transmitted, the terminal should perform monitoring on both of the candidate positions. This may increase initial complexity of the terminal. However, this method may increase the opportunities for attempting the LBT procedure, thereby enabling faster DRS transmissions and improving the reception performance of the terminal.

According to another exemplary embodiment of the present invention, any one among the option of configuring a single RMSI PDCCH monitoring occasion with single PBCH values and the option of configuring a plurality of RMSI PDCCH monitoring occasions with single PBCH values may be configured statically (or semi-statically) or dynamically. For example, the base station may configure the one option to the terminal using at least one of RRC signaling, MAC control element (CE), and downlink control information (DCI).

Multiplexing SS/PBCH Block and RMSI PDSCH in DRS Transmission

In order to satisfy the OCB regulation in the NR-U, other signals and channels may be multiplexed and transmitted with the SS/PBCH block in the DRS. As described above, in one of these multiplexing schemes, the SS/PBCH block may be multiplexed and transmitted with the RMSI PDCCH and the RMSI PDSCH. In the legacy NR, when a transmission resource of the RMSI PDCCH and the RMSI PDSCH overlaps with a transmission resource of the SS/PBCH block, the terminal may determine that there is no SS/PBCH block transmission and assume that the corresponding resource is used for transmission of the RMSI PDCCH and the RMSI PDSCH. Therefore, the transmission resource of the RMSI PDCCH and the RMSI PDSCH may be generally allocated so as not to overlap with the transmission resource of the SS/PBCH block. However, in the NR-U, in order to comply with the OCB regulation, the resource of the RMSI PDCCH or the RMSI PDSCH has no choice but to overlap the SS/PBCH block in time. In this case, if a receiving operation is performed like the legacy NR, the terminal may perform decoding under assumption that the RMSI PDCCH or the RMSI PDSCH is mapped to the region in which the SS/PBCH block is transmitted, and this may result in deterioration of reception performance. Accordingly, in an exemplary embodiment of the present invention, in case that the DRS, in which the SS/PBCH block is multiplexed with the RMSI PDCCH and the RMSI PDSCH, is transmitted, a method for resolving a problem occurring when the transmission resource region of the RMSI PDCCH or the RMSI PDSCH overlaps the transmission resource region of the SS/PBCH block is proposed.

First, the terminal having successfully received the SS/PBCH block in the DRS may know configuration information of the RMSI PDCCH using the PBCH information in the corresponding SS/PBCH block. The terminal may perform RMSI PDCCH monitoring based on the configuration information of the RMSI PDCCH (e.g., the above-described monitoring occasion), and may receive the RMSI PDSCH through obtained scheduling information of the RMSI PDCCH. Accordingly, the terminal having successfully received the SS/PBCH block may exactly know the positions of the received SS/PBCH block, the RMSI PDCCH, and the RMSI PDSCH. When the resource region of the RMSI PDCCH and the RMSI PDSCH overlaps with the resource region of the SS/PBCH block that has been successfully received, the terminal may assume that the RMSI PDCCH and the RMSI PSDCH are not mapped to the resource region of the SS/PBCH block, and decode the RMSI by performing rate matching according to the assumption.

Accordingly, the operations of the terminal for the legacy NR and the NR-U need to be configured differently. In addition, when such the method is applied, it is possible to determine whether the resource region of the RMSI PDCCH and the RMSI PDSCH overlaps with the resource region of the detected SS/PBCH block. However, whether the resource region of the RMSI PDCCH and the RMSI PDSCH overlaps candidate transmission resource regions of other SS/PBCH blocks cannot be determined. That is, the terminal cannot determine whether to perform rate matching according to whether the SS/PBCH block is actually transmitted in the candidate transmission resource region of another SS/PBCH block. This is because whether the SS/PBCH block is actually transmitted in another SS/PBCH block candidate transmission resource region is not known until the terminal detects the corresponding SS/PBCH block or identifies the RMSI information.

Therefore, in an exemplary embodiment of the present invention, when the resource region of the RMSI PDCCH does not overlap with the resource region of the SS/PBCH block and only the resource region of the RMSI PDSCH overlaps with the resource region of the SS/PBCH block, whether or not the SS/PBCH block is actually transmitted in the resource region of the RMSI PDSCH may be notified through information of the RMSI PDCCH. In this case, the terminal having successfully received the SS/PBCH block in the DRS may know configuration information (e.g., monitoring occasion) for the RMSI PDCCH through the PBCH information in the corresponding SS/PBCH block, and may obtain indication information (e.g., 1 bit indication) of the RMSI PDCCH information by performing RMSI PDCCH monitoring based on the configuration of the RMSI PDCCH. The indication information may indicate whether the resource region of the SS/PBCH block is actually used for transmission of the SS/PBCH block when the resource region of the RMSI PDSCH overlaps with the resource region of the SS/PBCH block. When it is determined based on the indication information that the resource region of the SS/PBCH block overlapped with the resource region of the RMSI PDSCH is actually used for transmission of the SS/PBCH block, the terminal may decode the RMSI by performing rate matching. In this case, even when the resource region of the RMSI PDSCH does not necessarily overlap with the resource region of only the detected SS/PBCH block but also overlaps with another SS/PBCH block candidate transmission resource region, signaling on whether an SS/PBCH block is actually transmitted in another SS/PBCH block candidate transmission resource region may be possible through the indication information.

In the examples of FIGS. 9 to 11, up to two SS/PBCH blocks may be transmitted within one slot. When the RMSI PDSCH associated with one of the two SS/PBCH blocks overlaps both of the transmission regions of the two SS/PBCH blocks, an exemplary embodiment of the present invention proposes a method of informing whether the SS/PBCH block is actually transmitted in each of the resource regions of the two SS/PBCH blocks. For example, when the RMSI PDSCH associated with the SS/PBCH block #n in FIG. 9 overlaps not only the region of the SS/PBCH block #n but also the region of the SS/PBCH block #n+1, if the SS/PBCH block #n is actually transmitted, but the SS/PBCH block #n+1 is not actually transmitted in the resource region of SS/PBCH block #n+1, the RMSI PDSCH may be decoded by performing rate matching on the region in which the SS/PBCH block #n is transmitted. On the other hand, since the SS/PBCH block #n+1 is not actually transmitted in the resource region of the SS/PBCH block #n+1, the corresponding region may be determined to be used for the transmission of the RMSI PDSCH, and thus the RMSI PDSCH may be decoded without performing rate matching. Accordingly, an exemplary embodiment of the present invention proposes a method of notifying whether the SS/PBCH block is actually transmitted in each of two SS/PBCH block resource regions within a slot by including 2 bits indication information in the RMSI PDCCH. Since two SS/PBCH block candidate transmission resource regions are defined within one slot according to the current structure, whether or not the SS/PBCH block is transmitted in each of them may be indicated through the 2 bits indication information. Meanwhile, when M SS/PBCH block resource regions are defined within a slot, whether or not the SS/PBCH block is actually transmitted in each of the SS/PBCH block resource regions may be notified to the terminal by using M bits indication information.

In the example of FIG. 9, when the RMSI PDSCH associated with SS/PBCH block #n overlaps not only the region of the SS/PBCH block #n but also the region of SS/PBCH block #n+1, the SS/PBCH block #n may be actually transmitted, but the SS/PBCH block #n+1 may not be actually transmitted in the resource region of the SS/PBCH block #n+1. In this case, the RMSI PDSCH may be decoded through rate matching on the region in which the SS/PBCH block #n is transmitted. Since the SS/PBCH block #n+1 is not actually transmitted in the resource region of the SS/PBCH block #n+1, the corresponding region may be determined to be used for the transmission of the RMSI PDSCH, and the RMSI PDSCH may be decoded in the resource region of the SS/PBCH block #n+1 without performing rate matching. In this case, since the terminal has successfully received the SS/PBCH block #n, the terminal may know whether the candidate transmission resource region of the SS/PBCH block #n is actually used for the transmission of the SS/PBCH block #n without additional indication. However, the terminal may not know whether the candidate transmission resource region of the SS/PBCH block #n+1 is actually used for the transmission of the SS/PBCH block #n+1. Therefore, an exemplary embodiment of the present invention proposes a method of informing whether the SS/PBCH block is actually transmitted in another SS/PBCH block candidate transmission resource region other than the SS/PBCH block candidate transmission resource region in which the terminal actually succeeds in receiving the SS/PBCH block through 1 bit indication information. That is, since the terminal has successfully detected the SS/PBCH block #n, the terminal may determine that the SS/PBCH block #n is actually transmitted in the corresponding candidate transmission resource region. Thus, the above method is a method of informing whether the SS/PBCH block is actually transmitted in the resource region of the SS/PBCH block #n+1 when the associated RMSI PDSCH overlaps with the resource region of the SS/PBCH block #n+1. Since two SS/PBCH block candidate transmission resource regions are defined within one slot according to the current structure, whether the SS/PBCH block is actually transmitted in another SS/PBCH block candidate transmission resource region other than the SS/PBCH block transmission resource region in which the SS/PBCH block is actually transmitted may be informed through 1 bit indication information. Meanwhile, when M SS/PBCH block candidate transmission resource regions are defined within a slot, whether or not the SS/PBCH block is actually transmitted in each of the remaining SS/PBCH block candidate transmission resource regions excluding the SS/PBCH block candidate transmission resource region in which the SS/PBCH block is actually detected may be informed to the terminal by using (M−1) bits indication information.

In the legacy release 15 NR system, SS/PBCH block candidate transmission resource regions (i.e., candidate positions) are defined so that up to L SS/PBCH blocks can be transmitted within an SS/PBCH block burst set. L has a different value according to a frequency region. In this case, according to an environment the base station may actually transmit SS/PBCH blocks in all of the L positions, or may actually transmit SS/PBCH blocks only in some of the L positions. On the other hand, when a data receiving terminal receives data in the position where the SS/PBCH block can be transmitted, the terminal may determine whether to perform matching rate of the received data according to whether or not the SS/PBCH block is actually transmitted at the corresponding position. In this case, information on the positions where the SS/PBCH blocks are actually transmitted may be transferred to the terminal through the RMSI and terminal-specific (i.e., UE-specific) RRC signaling. When the information is transferred through the RMSI and L is 4 or 8, the information may be configured as a bitmap. In the bitmap, a bit corresponding to a position where the SS/PBCH block is actually transmitted may be set to '1' and a bit corresponding to a position where the SS/PBCH block is not actually transmitted may be set to '0'. When L=64, information on 64 positions may be transferred in a compressed form. In this case, the terminal receiving the RMSI information may determine whether or not to perform rate matching of the received data through the corresponding information. On the other hand, when the information is transferred through UE-specific RRC signaling, the information may be transferred in a bitmap regardless of the value of L.

In the case of the NR-U system, since the success or failure of the LBT procedure may determine whether to transmit the DRS including the SS/PBCH block, DRS candidate positions more than L of the conventional system may be defined to secure further more DRS transmission opportunities. In addition, in the NR-U system, the positions of the actually-transmitted SS/PBCH blocks may be changed depending on whether the LBT procedure succeeds, and thus it is advantageous to transmit SS/PBCH blocks in consecutive positions in order to transmit as many SS/PBCH blocks as possible when the LBT procedure succeeds. In such the NR-U environment, the method of informing information on the positions where the SS/PBCH blocks are actually transmitted through the legacy RMSI and UE-specific RRC signaling may not be appropriate. Accordingly, an exemplary embodiment of the present invention proposes a method of transferring information on actual SS/PBCH block transmission positions varying depending on whether the LBT procedure is actually successful or not in consideration of the NR-U environment. The following description is described according to the operation based on the RMSI, but the same may be applied to the UE-specific RRC signaling.

As described above, in the NR-U environment, more candidate positions of the SS/PBCH blocks are configured as compared to the legacy release 15 NR (e.g., in the case of release 15 NR, L=4 or 8 depending on the frequency band; in the case of NR-U, L=10 or 20 depending on the subcarrier spacing), and the positions used for actual SS/PBCH block transmission may vary depending on whether the LBT procedure succeeds or not rather than the semi-static configuration as in the legacy release 15 NR. In addition, it is advantageous to transmit SS/PBCH blocks in consecutive positions in order to transmit as many SS/PBCH blocks as possible when the LBT procedure succeeds. Accordingly, in an exemplary embodiment of the present invention, instead of the method of using a bitmap format (when L=4 or 8) or a compressed form (when L=64) in the legacy release 15 NR, a method of informing the actual success time point of the LBT procedure and the number of continuously-transmitted SS/PBCH blocks is proposed. In this case, it is preferable to fix the number of continuous SS/PBCH blocks to a number smaller than L to reduce the system overhead. When the bitmap is used, the size of the bitmap may increase from 4 or 8 bits to 10 or 20 bits according to the increased L in the NR-U environment. In addition, when the actual transmission positions are changed according to whether the LBT procedure succeeds or not, the bitmap information may also be changed. Therefore, in an exemplary embodiment of the present invention, the base station may inform the terminal of a starting position where the SS/PBCH blocks start to be actually transmitted among the 10 to 20 SS/PBCH block candidate positions and the number of continuously-transmitted SS/PBCH blocks. Through this, the number of bits representing the information may be reduced.

TABLE 1

| Length (L) | Bitmap | Proposed scheme |
| --- | --- | --- |
| 10 | 10 bits | Starting position: ceil(log2(10)) = 4 bits<br>Length: 4 bits (when assuming that up to 8 consecutive SS/PBCH blocks can be transmitted)<br>Totally, 8 bits |
| 20 | 20 bits | Starting position: ceil(log2(10)) = 5 bits<br>Length: 4 bits (when assuming that up to 8 consecutive SS/PBCH blocks can be transmitted)<br>Totally, 9 bits |

Table 1 above is a table comparing the number of bits used in case of using the bitmap scheme of the legacy release 15 NR system and the number of bits used in case of applying the exemplary embodiment of the present invention when L=10 or 20. When the bitmap scheme is used, 10 bits or 20 bits are required. However, when the proposed scheme is applied, necessary information may be represented by 8 bits or 9 bits, thereby reducing signaling overhead.

Figure 13:
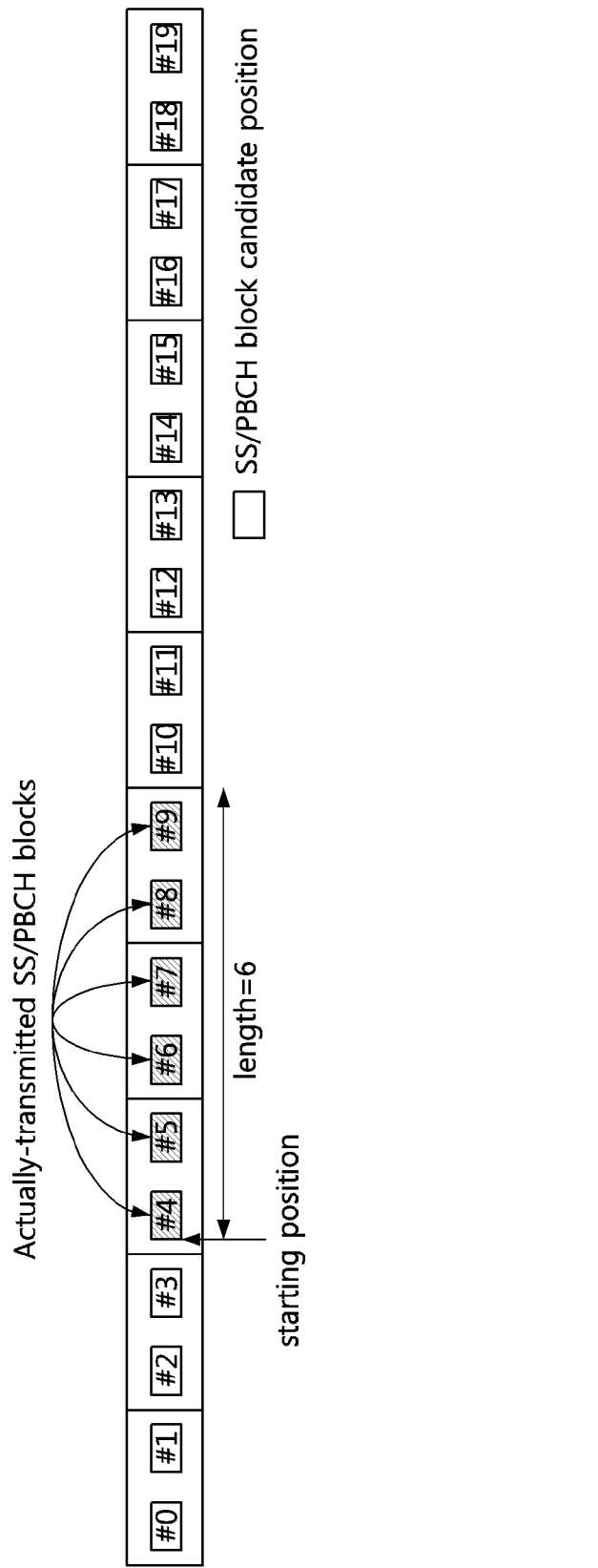
FIG. 13 is a conceptual diagram for describing a method of expressing actual transmission positions of SS/PBCH blocks according to an exemplary embodiment of the present invention.

FIG. 13 is a conceptual diagram for describing a method of expressing actual transmission positions of SS/PBCH blocks according to an exemplary embodiment of the present invention.

Referring to FIG. 13, there are 20 SS/PBCH block candidate positions. Assuming that the SS/PBCH blocks can be transmitted from a position #4 after the successful LBT procedure and a total of 6 SS/PBCH blocks are transmitted, '001000110', which is a combination of '00100' indicating the position #4 where the transmission of the SS/PBCH blocks starts and '0110' indicating the six continuous SS/PBCH blocks, may be obtained.

Based on the combined information, the terminal may know that the SS/PBCH blocks are actually transmitted in the six positions (i.e., #4, #5, #6, #7, #8, and #9) from the position #4. The terminal may reliably decode data by performing rate matching when receiving the data according to the information. In this case, 4 bits information is required to express the maximum number of 8 continuous transmissions, but when at least one SS/PBCH block is assumed to be always transmitted, up to 8 continuous transmissions may be expressed with only 3 bits information. For example, by expressing the number of continuous SS/PBCH blocks in a manner in which '000' expresses for one, '001' expresses two, '010' expresses three, and '111' expresses eight, the amount of bits may be further reduced by 1 bit, excluding the case where any SS/PBCH block is not transmitted.

As described above, up to two SS/PBCH blocks may be transmitted within one slot. When the DRS is configured with a half slot, up to two DRSs may be configured within one slot. However, when there is a lot of information in the RMSI constituting the DRS, it may be difficult to configure the DRS within a half slot. In this case, it may be necessary to configure the DRS in one slot unit, and only one SS/PBCH block of the two may be actually transmitted within one slot. In this case, even though the number of consecutive SS/PBCH blocks that are actually transmitted is the same, the positions of the SS/PBCH blocks that are actually transmitted may vary according to the number of the DRS that can be configured within one slot. Accordingly, in an exemplary embodiment of the present invention, 1 bit indication information indicating whether two DRSs are configured within one slot or only one DRS is configured within one slot may be added.

Figure 14:
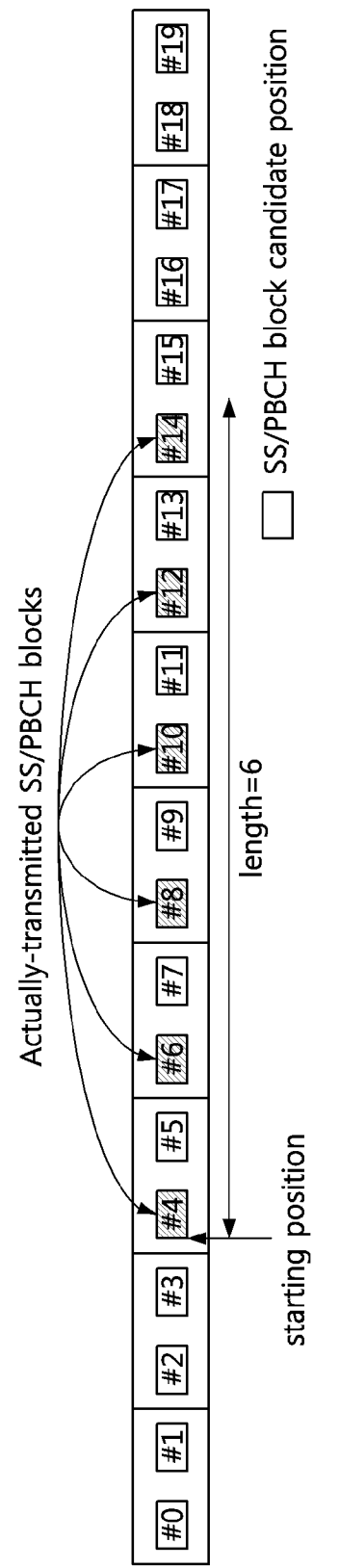
FIG. 14 is a conceptual diagram for describing a method of representing actual transmission positions of SS/PBCH blocks according to another exemplary embodiment of the present invention.

FIG. 14 is a conceptual diagram for describing a method of representing actual transmission positions of SS/PBCH blocks according to another exemplary embodiment of the present invention.

In the exemplary embodiment shown in FIG. 14, when it is informed to the terminal through separate indication information that the DRS is configured in one slot unit and only one SS/PBCH block is transmitted within one slot, the position information of the SS/PBCH blocks actually transmitted may be derived by combining the starting position of the actually-transmitted SS/PBCH blocks and the information on the number of consecutive SS/PBCH blocks. As shown in the exemplary embodiment of FIG. 13, it is assumed that actual transmission of the SS/PBCH blocks is started at the position #4 and six SS/PBCH blocks are continuously transmitted. However, since the exemplary embodiment of FIG. 14 corresponds to the case where only one SS/PBCH block is transmitted within one slot, the terminal may know, through the additional 1 bit indication information, that the SS/PBCH blocks are actually transmitted in the positions corresponding to (#4, #6, #8, #10, #12, #14) not (#4, #5, #6, #7, #8, #9) of the exemplary embodiment of FIG. 13. The terminal may identify the actual SS/PBCH block transmission positions through the combination of the above-described information, and may perform data reception more reliably by using the corresponding information. In this case, the terminal may additionally use 1 bit indication information indicating the candidate position in which the SS/PBCH block is actually transmitted (e.g., the first SS/PBCH block candidate position or the second SS/PBCH block candidate position) among the two SS/PBCH block candidate positions. However, this may be replaced with least significant bit (LSB) information of the information indicating the starting position of the actual transmission of the SS/PBCH blocks.

In the NR-U, the actual transmission position of the DRS including the SS/PBCH block may be changed depending on whether the LBT procedure is successful. Therefore, the position in which the actual transmission of the DRS starts may change depending on the result of the LBT procedure for each transmission period of the DRS. In this case, since the information of the RMSI may be changed, the reception complexity of the terminal may increase when the reception performance is increased by combining the RMSI transmitted periodically. In addition, whenever the system information is changed, the base station should inform the terminal that the system information has been changed through a system information update indication, and since the terminal needs to receive the changed system information again whenever the system information is changed, the complexity may increase. Therefore, a method of transmitting only the remaining information except the starting position among the information included in the RMSI through the RMSI is proposed. In this case, since the system information is not changed according to the result of the LBT procedure, the reception performance of the system information can be improved, and the complexity of the terminal for monitoring the system information can be reduced. However, since the terminal cannot know the starting position of the actual transmission of the SS/PBCH blocks, an additional operation for identifying this may be required, and the terminal may not directly use the corresponding RMSI information and may require a combination of additional information. For example, whether or not to perform rate matching in consideration of the resource region of the SS/PBCH block may be indicated by using DCI information including additional PDSCH scheduling information. The above-described information elements may all be transmitted together or may be transmitted as consisting of only some of them. As another method, a method of transmitting only the remaining information except the starting position through the RMSI and separately transmitting information on the starting position through another channel is proposed. More specifically, the information on the starting position may be transmitted as included in the payload of the PBCH in the DRS. In this case, since the PBCH payload is changed according to each transmission time, the reception complexity may increase. It is also possible to transmit the information through the RMSI PDCCH in the DRS. In general, since the RMSI PDCCH is not received through combining, it may be preferable to use the RMSI PDCCH to transmit information on the actual transmission starting position that is changed depending on whether the LBT procedure is successful.

As described above, in the NR-U, the number L of the SS/PBCH block candidate positions may be configured differently according to the subcarrier spacing. L=10 when the subcarrier spacing is 15 kHz, and L=20 when the subcarrier spacing is 30 kHz. Among the SS/PBCH block candidate positions, the number of SS/PBCH blocks that can be actually transmitted after the success of the LBT procedure may be limited to the maximum of X. For example, when the LBT procedure is successful before the starting position of the SS/PBCH block candidate positions, 10 or 20 (i.e., L=10 or 20) SS/PBCH blocks can be transmitted, but the number of SS/PBCH blocks actually transmitted may be limited to X (<=L). In this case, it is preferable that the number of SS/PBCH blocks that can be actually transmitted is limited to one among 1, 2, 4, and 8, which are divisors of 8 that can be indexed by a PBCH DMRS in the SS/PBCH block. When the maximum number of SS/PBCH blocks actually transmitted is limited to X, the number of beams that the base station can use for the SS/PBCH block transmission may be limited to X. When the SS/PBCH blocks are transmitted through different beams in order to increase coverage of the base station, the terminal should perform measurements such as received signal strength (e.g., RSRP) measurement for each SS/PBCH block, and perform reporting on the measurement for each SS/PBCH block. However, when the number of beams used in the base station is limited to B (<=X), the base station may repeatedly use the same beam within the maximum number of the SS/PBCH blocks that can be transmitted. For example, when the maximum number of SS/PBCH blocks that can be transmitted is 8 and the number of beams used in the base station is 4, since 8 SS/PBCH blocks can be transmitted using 4 beams, so that the SS/PBCH block may be transmitted twice per the same beam. In this case, when the terminal receiving the corresponding SS/PBCH block knows information on the SS/PBCH block transmitted through the same beam, the terminal may perform measurement and reporting on the entire SS/PBCH blocks transmitted through the same beam without separately performing measurement and reporting for each SS/PBCH block. Accordingly, the accuracy of the measurement can be increased and the overhead of reporting can be reduced. Therefore, it is preferable to transmit to the terminal information on the beam through which the SS/PBCH blocks are transmitted. The information on the beam may preferably inform the terminal of the number of beams used by the base station.

As another method, a method of signaling a specific parameter value Q to the terminal may be used. When the value of Q is signaled to the terminal, the terminal receiving the corresponding value may determine that SS/PBCH blocks having the same value result in a modular operation modulo (A, Q) are transmitted through the same beam. In the exemplary embodiments of the present invention, the information on the beam may be represented by Quasi-Co-Located (QCL) information, and the same beam may be interpreted as beams having the same QCL information (i.e., beams having QCL relation). In this case, the value A may be an index of the SS/PBCH block candidate position or an index of a PBCH DMRS sequence in the SS/PBCH block. In this case, the information on the positions in which the SS/PBCH block is actually transmitted may be signaled as limited by the value Q. More specifically, when Q=8, the information on the positions in which the SS/PBCH blocks are actually transmitted may be signaled as configured as a bitmap of 8 bits. In this case, a bit corresponding to a position used for the actual SS/PBCH block transmission in the corresponding bitmap may be set to '1', and a bit corresponding to a position not used for the actual SS/PBCH block transmission in the corresponding bitmap may be set to '0'. When signaled as limited by the value Q, the number of bits of the bitmap required for the signaling may vary according to the value Q, which may increase signaling complexity. Therefore, in an exemplary embodiment of the present invention, the number of bits of the bitmap may be configured according to the configurable maximum value of Q, and only a part of the bitmap may be determined as valid information according to the configured value Q. More specifically, when Q={1, 2, 4, 8}, the maximum value of Q is 8, and thus a bitmap of 8 bits may be formed. When the actual value of Q is 4, only as many bits as Q bits from the MSB (or leftmost bit) of the bitmap may be determined to be valid information. For example, when an eight-bits bitmap ('1100XXXX') is signaled and Q=4, only '1100' may be determined to be valid information as information on the positions actually used for transmission of the SS/PBCH blocks. The remaining 'XXXX' may be ignored. In this case, the terminal may apply the valid information according to the signaled Q to the entire SS/PBCH block candidate positions in a cyclic-wrap-around manner to determine whether to perform rate matching on the received data at each SS/PBCH block candidate position. More specifically, when Q=4 and the bitmap '1100XXXX' is signaled as described above, the terminal may cyclically apply only '1100' determined as valid to L SS/PBCH block candidate positions. For example, when L=10, a bitmap '1100110011' may be obtained by cyclically applying '1100' to the entire 10 SS/PBCH block candidate positions. In this case, the terminal may determine whether to perform rate matching on the received data at each SS/PBCH block candidate position by applying the bitmap to the entire L SS/PBCH block candidate positions. This method may reduce the signaling overhead compared to the method of transmitting the bitmap having the length of L about whether the SS/PBCH block is actually transmitted in each of the entire L SS/PBCH block candidate positions. However, when the terminal determines whether to perform rate matching on the received data by cyclically applying the valid information according to the signaled Q to the entire SS/PBCH block candidate positions, if the SS/PBCH blocks are not actually transmitted in the time period corresponding to the entire L candidate positions, unnecessary rate matching may occur and resource waste due thereto may occur. Therefore, according to an exemplary embodiment of the present invention, when actual SS/PBCH block transmission may occur only in some of the L SS/PBCH block candidate positions, a time period corresponding thereto may be separately configured. Accordingly, a partial bitmap corresponding to a time period configured as a period in which the actual SS/PBCH block transmission may occur may be obtained from the bitmap obtained by cyclically applying the valid information according to the signaled Q to the entire L SS/PBCH block candidate positions, and the partial bitmap may be used to determine whether to perform rate matching on the received data.

FIG. 15 is a conceptual diagram for describing a method of representing actual transmission positions of SS/PBCH blocks according to another exemplary embodiment of the present invention.

Referring to FIG. 15, as described above, when Q=4 and a bitmap ('1100XXXX') is signaled, only '1100' determined as valid is cyclically applied to the L SS/PBCH block candidate positions. When L=10, a bitmap ('1100110011') may be generated, and when L=20, a bitmap ('11001100110011001100') may be generated. In this case, when it is configured that transmission of SS/PBCH blocks can actually occur only within a 2 ms time period of a 5 ms time period corresponding to the L SS/PBCH block candidate positions, the terminal may determine a partial bitmap (i.e., bitmap for slots #n and #n+1 of FIG. 15) corresponding to the time period (i.e., 2 ms) configured in the corresponding bitmap as valid. The terminal may use the determined partial bitmap to determine whether to perform rate matching on the received data. In the example of FIG. 15, when L=10, a valid partial bitmap in the bitmap '1100110011' may be determined as '1100'. When L=20, a valid partial bitmap in the bitmap '11001100110011001100' may be determined as '11001100'.

The above-described method is a method in which a valid partial bitmap corresponding to a separately-configured time period in which actual SS/PBCH block transmission occurs is derived from a bitmap generated by cyclically applying the valid information according to the signaled Q to the entire L SS/PBCH block candidate positions, and whether to perform rate matching on the received data is determined by using the derived partial bitmap.

In another method, the terminal may not cyclically apply the valid information according to the signaled Q to the entire L SS/PBCH block candidate positions, but the terminal may derive a bitmap by applying the valid information only to the SS/PBCH block candidate positions corresponding to the separately-configured time period in which the actual SS/PBCH block transmissions occur among the entire L SS/PBCH block candidate positions, and use the derived bitmap to determine whether to perform rate matching on the received data. That is, the terminal may obtain the same effect by cyclically applying the valid information according to the signaled Q only to the SS/PBCH block candidate positions corresponding to the separately-configured time period in which the actual SS/PBCH block transmissions can occur.

In exemplary embodiments of the present invention, the information on the beam may be represented by Quasi-Co-Located (QCL) information, and the same beam may be interpreted as beams having the same QCL information (i.e., beams having QCL relation) and may also be interpreted as SS/PBCH blocks having the same result in the modulo (A, Q) operation. Thus, in another method, SS/PBCH blocks having the same result in the modulo (A, Q) operation may be defined with one SSB index, and a bitmap may be configured only for the SS/PBCH block indexes corresponding to the SS/PBCH blocks that can be transmitted. In this case, the corresponding bitmap may have a length of Q, and it may be determined that only a partial bitmap corresponding to the Q value is valid in the bitmap of 8 (i.e., the maximum value of Q) bits. As described above, the terminal may determine whether to perform rate matching on the received data by cyclically applying the bitmap of Q bits only to the SS/PBCH block candidate positions corresponding to the separately-configured time period in which the actual SS/PBCH block transmissions can occur.

On the other hand, in the modulo (A, Q) operation, the value A may be an index for the SS/PBCH block candidate position or an index of the PBCH DMRS sequence in the SS/PBCH block. In addition, in the modulo (A, Q) operation, the value Q may be preferably limited to specific values for the overhead of signaling and fairness of the transmission opportunities between beams. For example, when the maximum number of transmissions of the SS/PBCH block is limited to X=8 and Q is signaled as 5, three remaining SS/PBCH blocks except five SS/PBCH blocks transmitted once through all of the available beams (i.e., five beams) among the eight SS/PBCH blocks that can be actually transmitted may be transmitted using only some of the available beams. As a result, some beams (i.e., 3 beams) are each transmitted through two SS/PBCH blocks, but the remaining beams (i.e., 2 beams) are each transmitted only through one SS/PBCH block, so a difference in measurement accuracy may occur. In order to solve this problem, it is preferable to limit the Q value so that the number of transmissions of SS/PBCH blocks per beam can always be equalized. Therefore, an exemplary embodiment of the present invention proposes a method of limiting the Q value in consideration of the maximum number of SS/PBCH blocks that can be actually transmitted and the number of SS/PBCH block candidate positions. More specifically, a method of limiting the Q value to a divisor of the maximum number of SS/PBCH blocks that can be actually transmitted and the number of SS/PBCH block candidate positions, and limiting the maximum value of Q as the greatest common divisor (GCD) of the maximum number of SS/PBCH blocks that can be actually transmitted and the number of SS/PBCH block candidate positions may be used. For example, when the maximum number of SS/PBCH blocks that can be actually transmitted is X, and the number of SS/PBCH block candidate positions according to the subcarrier spacing is L, the maximum value of Q may be defined as GCD (X, L), and Q may be set to one of the divisors of GCD (X, L). For example, when the subcarrier spacing is 15 KHz, Q may be 1 or 2, and when the subcarrier spacing is 30 kHz, Q may be 1, 2, or 4. When limiting Q as described above, the terminal may always have an equal number of SS/PBCH blocks that can be transmitted per beam regardless of L when determining whether the same beam is used or not after performing the modulo (A, Q) operation. Alternatively, the number of PBCH DMRS sequences may be applied instead of the maximum number of SS/PBCH blocks that can be actually transmitted. By the above-described methods, Q may be signaled to the terminal through system information such as RMSI or as included in a PBCH content.

The exemplary embodiments of the present invention may be applicable regardless of the case where A in the above-described modulo (A, Q) operation is the index of the SS/PBCH block candidate position or the index of the PBCH DMRS sequence in the SS/PBCH block. However, when it is necessary to perform measurement for a neighbor cell, the terminal may need a decoding operation on the PBCH to identify the candidate position index of the SS/PBCH block transmitted from the neighbor cell. This may increase the reception complexity of the terminal. Therefore, in order to allow the terminal to perform measurement on the neighbor cell without the PBCH decoding, A may be preferably the PBCH DMRS sequence index rather than the SS/PBCH block candidate position index. In addition, if the terminal knows Q (for the neighbor cell) when performing the measurement on the neighbor cell, it may be advantageous to perform the measurement since SS/PBCH blocks transmitted through the same beam can be determined. Therefore, in an exemplary embodiment of the present invention, information on Q for the neighbor cell may be transferred to the terminal through system information or UE-specific RRC signaling. The terminal may more efficiently and accurately measure the neighbor cell based on Q for the neighbor cell obtained through the system information. However, depending on the system environment, it may be difficult to transfer information of Q values for all neighbor cells through the system information or the UE-specific RRC signaling. Therefore, in an exemplary embodiment of the present invention, when information on Q for a cell detected by the terminal is not included in the Q value(s) for the neighbor cell(s) previously received, the terminal may perform the measurement under assumption that Q is the configurable maximum value of Q. When the measurement is performed under such the assumption, the efficiency of the measurement may be reduced, but the measurement operation may be performed without ambiguity about the beam of the SS/PBCH block. For example, if the Q value for the neighbor cell is not signaled and the maximum value of Q is set to GCL (X, L), the Q value for the neighbor cell may be set to 2 when the subcarrier spacing of the neighbor cell is 15 kHz, and the Q value for the neighbor cell may be set to 4 when the subcarrier spacing of the neighbor cell is 30 kHz. In this case, when information on the subcarrier spacing for the neighbor cell is not obtained, the Q value may be configured based on a subcarrier spacing set as a default value. More specifically, in the case of NR-U, since the default subcarrier spacing for the SS/PBCH block transmission is 30 kHz, when information on the subcarrier spacing for the neighbor cell is not obtained, the terminal may set the Q value for the neighbor cell to 4, and perform measurement.

As described above, the base station may attempt the LBT procedure before transmitting the SS/PBCH block, and may transmit the SS/PBCH block only when the LBT procedure is successful. When the success time point of the LBT procedure is delayed, some SS/PBCH blocks may not be transmitted because the number of remaining SS/PBCH block candidate positions is smaller than the actual number of SS/PBCH blocks that can be transmitted. Therefore, in an exemplary embodiment of the present invention, the position in which the LBT procedure can be attempted may be limited so that all of the SS/PBCH blocks that can be actually transmitted are transmitted when the LBT procedure is successful. More specifically, when the number of SS/PBCH block candidate positions is L and the number of SS/PBCH blocks that can be actually transmitted is X, a method of limiting the last attempt position of the LBT procedure to a position before the transmission time of the (L−X+1)-th (i.e., when indexing starts from 0) SS/PBCH block. When limiting the last attempt position of the LBT procedure to the position before the transmission time of the (L−X+1)-th SS/PBCH block, if the base station succeeds in the LBT procedure before that time, the base station can always transmit as many SS/PBCH blocks as the maximum number of SS/PBCH blocks that can be transmitted. In another exemplary embodiment of the present invention, a method of limiting the last attempt position of the LBT procedure to a position before the transmission time of the (L−Q+1)-th SS/PBCH block may be used. In this case, even when the base station having succeeded in the LBT procedure before the corresponding time cannot transmit as many SS/PBCH blocks as the maximum number of SS/PBCH blocks that can be actually transmitted, the base station may transmit the SS/PBCH blocks at least once through all the beams used by the base station. In the exemplary embodiments of the present invention, the information on the beam may be represented by Quasi-Co-Located (QCL) information, and the same beam may be interpreted as beams having the same QCL information (i.e., beams having QCL relation). In addition, the number of PBDM DMRS sequences, the maximum number of SS/PBCH blocks that can be actually transmitted, or the number of SS/PBCH block candidate positions mentioned in the exemplary embodiments of the present invention is just one example which is helpful in understanding of the present invention, and any other value may be configured therefor.

Configuration of Mapping Relation Between SS/PBCH Block within DRS and RACH Occasion The terminal may complete cell search and perform time and frequency synchronization through the SS/PBCH block at an initial access. Thereafter, the terminal may undergo a random access procedure to acquire uplink synchronization and establish a radio link. The first process of performing the random access procedure is a process in which the terminal transmits a RACH preamble. In this case, the terminal may transmit a predetermined RACH preamble format and sequence at a RACH transmittable time point (i.e., RACH occasion (RO)) based on the detected SSB and the acquired system information. In the case of the NR-U system, the terminal may transmit the RACH preamble only within a channel occupancy time (COT) secured by the base station or the terminal, or when the LBT procedure is successful. Therefore, when the RACH occasion does not exist within the COT or the LBT procedure does not succeed before the RACH occasion, the terminal cannot transmit the RACH preamble at the corresponding time, which results in an initial access delay. In general, in the NR system, the RACH occasion may be variously configured according to a transmission periodicity and an offset value. For example, only one RACH occasion may be configured per SS/PBCH block, a plurality of RACH occasions may be configured per SS/PBCH block, and a plurality of SS/PBCH blocks may be configured to one RACH occasion. When a plurality of RACH occasions are configured per SS/PBCH block, consecutive allocation of RACH occasions is possible, but this is possible only when the plurality of RACH occasions are configured on the frequency axis at one transmission time point.

Accordingly, in order to solve such the problem, the NR-U may configure RACH occasions at a plurality of transmission time points per SS/PBCH block. In this case, it is understood that configuration of the RACH occasions at a plurality of transmission time points means configuration of a plurality of RACH occasions having different transmission time points. Therefore, even when the RACH preamble transmission cannot be performed due to a failure of the LBT procedure in a specific RACH occasion, the initial access delay problem can be solved because the RACH preamble transmission can be attempted in another RACH occasion. When assigning a plurality of RACH occasions per SS/PBCH block, the same RACH occasion may be shared by SS/PBCH blocks transmitted through the same beam. Therefore, in an exemplary embodiment of the present invention, a method of configuring the SS/PBCH blocks transmitted through the same beam to share a plurality of RACH occasions may be used. More specifically, by configuring a plurality of RACH occasions for a specific SS/PBCH block (hereinafter, referred to as 'first SS/PBCH block' for convenience) and configuring a plurality of RACH occasions that are identical as those of the first SS/PBCH block for another SS/PBCH block (hereinafter, referred to as 'second SS/PBCH block' for convenience) transmitted through the same beam, the two SS/PBCH blocks may be configured so as to share the same RACH occasions. In this case, a plurality of RACH occasions, which are different from those corresponding to the first and second SS/PBCH blocks, may be configured for yet another SS/PBCH block (hereinafter, referred to as 'third SS/PBCH block' for convenience) transmitted through another beam. In yet another method, a plurality of RACH occasions (hereinafter referred to as 'first RO set') may be configured to the first SS/PBCH block and another plurality of RACH occasions (hereinafter referred to as 'second RO set') may be configured to the second SS/PBCH block. When it is determined that the first SS/PBCH block and the second SS/PBCH block are transmitted through the same beam, a method for the two SS/PBCH blocks to share the union of the first RO set and the second RO set may be used. In this case, in case of another third SS/PBCH block transmitted through another beam, a plurality of RACH occasions (hereinafter, referred to as 'third RO set' for convenience) different from the first RO set and the second RO set may be configured. In this case, the SS/PBCH blocks transmitted through the same beam may be interpreted as SS/PBCH blocks having the same QCL, and may also be interpreted as SS/PBCH blocks having the same result in the above-described modulo (A, Q) operation. That is, the SS/PBCH blocks having the same result in the modulo (A, Q) operation may be defined with one SSB index, and at least one RACH occasion may be configured for the corresponding SS/PBCH block index. In the modulo (A, Q) operation, A may be an index of the SS/PBCH block candidate position or an index of a PBCH demodulation reference signal (DMRS) sequence in the SS/PBCH block. In addition, in the above-described exemplary embodiment, the case where two SS/PBCH blocks are transmitted through the same beam is taken as an example, but the exemplary embodiments of the present invention may be applied even when three or more SS/PBCH blocks are transmitted through the same beam. In addition, in the exemplary embodiments of the present invention, a plurality of RACH occasions mean one or more RACH occasions and may mean one RACH occasion. In addition, in the exemplary embodiments of the present invention, the concept of the SS/PBCH blocks transmitted through the same beam (i.e., SS/PBCH blocks having QCL relation to each other, or SS/PBCH blocks having the same result in the modulo (A, Q) operation) may be equally applicable to a relation between transmission and reception of other channels as well as the mapping relation between SS/PBCH block and RACH occasion. More specifically, the above concept may be applied to configuration of a monitoring occasion of a control channel for receiving system information (e.g., other system information (OSI)) and to configuration of a control channel for receiving paging information.

Signaling for RMSI Combining within a DRS Burst

When a specific SS/PBCH block (hereinafter, referred to as 'first SS/PBCH block') is detected within a burst composed of a plurality of slots in which a plurality of SSBs are transmitted, the terminal may identify information on a CORESET (i.e., CORESET #0) and information on a search space set (i.e., Type® PDCCH search space) for monitoring the RMSI PDCCH in the corresponding slot (hereinafter, referred to as 'first slot') based on the PBCH information in the first SS/PBCH block. The terminal may receive the RMSI PDCCH using the corresponding information, and may receive the RMSI PDSCH based on the information. In this case, the terminal may assume that the RMSI PDCCH and the RMSI PDSCH are transmitted through the same beam as the detected first SS/PBCH block. There may be other SS/PBCH blocks transmitted through the same beam in different slots within the burst. The terminal may determine that the RMSI PDCCHs and the RMSI PDSCHs transmitted in the slots in which the corresponding SS/PBCH blocks are transmitted are also transmitted through the same beam, and thus may increase the reception performance by combining them. When the first SS/PBCH block is detected and a position of a slot (hereinafter, referred to as 'second slot') in which an SS/PBCH block (hereinafter referred to as 'second SS/PBCH block') that is determined to be transmitted through the same beam can be determined based on the first SS/PBCH block, the terminal may directly perform a reception procedure of the RMSI PDCCH and RMSI PDSCH through combining in the second slot determined to be transmitted through the same beam as the first slot in which the first SS/PBCH block is detected without an additional SS/PBCH block detection procedure. In this case, reception performance gain can be obtained by combining both the RMSI PDCCHs and the RMSI PDSCHs transmitted through the first slot and the second slot. However, in order to combine the RMSI PDCCHs, contents of control information in the PDCCHs should be the same so that the reception procedure through the combining can be performed without increasing the complexity. The content of the control information may change depending on a channel situation. Even when the same data is transmitted several times, it may be transmitted by changing a redundancy version (RV) in channel coding to obtain a channel coding gain, which may be signaled through control information. Even in this case, since the control information may be changed, it may not be preferable to keep the content of the control information the same. Therefore, the reception performance improvement through combining may be applied only to the RMSI PDSCH. The terminal may obtain RMSI PDSCH scheduling information in the first slot by receiving the RMSI PDCCH in the first slot, obtain RMSI PDSCH scheduling information in the second slot by receiving the RMSI PDCCH in the second slot, and improve the reception performance by combining of the RMSI PDSCHs of the two slots. However, although the second slot in which the second SS/PBCH block can be transmitted may be determined through the first SS/PBCH block detected in the first slot, the terminal may not determine whether the SS/PBCH block is actually transmitted in the second slot, and may also not determine whether the RMSI PDCCH and RMSI PDSCH are actually transmitted in the second slot. In order to identify that the RMSI PDCCH and RMSI PDSCH are actually transmitted in the second slot, the terminal should proceed again with the SS/PBCH block detection procedure in the second slot and determine whether the RMSI PDCCH and RMSI PDSCH are transmitted in the second slot. In such the case, the above-described complexity reduction effect obtained by combining the RMSI PDCCHs and the RMSI PDSCHs with omitting the SS/PBCH block detection procedure may not be obtained. In another case, only the RMSI PDCCH and the RMSI PDSCH may be transmitted in the second slot without transmitting the SS/PBCH block. In this case, even when the SS/PBCH block detection procedure is performed, the SS/PBCH block cannot be detected, so it is not possible to determine whether the RMSI PDCCH and the RMSI PDSCH are actually transmitted. Accordingly, an exemplary embodiment of the present invention proposes methods for improving the RMSI PDCCH and RMSI PDSCH reception performance through combining without SS/PBCH block detection procedure in the second slot. More specifically, a method of signaling whether the RMSI PDCCH and the RMSI PDSCH are actually transmitted in the next slot determined to be transmitted through the same beam using 1 bit indication information may be used. The terminal may determine a second slot determined to be transmitted through the same beam through the first SS/PBCH block detected in the first slot, and identify whether the RMSI PDCCH and the RMSI PDSCH are actually transmitted in the second slot through the 1 bit indication information. Therefore, even when the terminal does not perform the SS/PBCH block detection procedure in the second slot or when the SS/PBCH block is not actually transmitted in the second slot, the reception performance may be improved by combining the RMSI PDCCHs and the RMSI PDSCHs of the two slots. In this case, the 1 bit indication information indicating whether the RMSI PDCCH and the RMSI PDSCH are actually transmitted in the next slot transmitted through the same beam may be transmitted through the PBCH or the RMSI PDCCH. On the other hand, the terminal may assume that the RMSI PDCCH and the RMSI PDSCH are transmitted in the second slot transmitted through the same beam without explicit indication through the corresponding 1 bit indication information, and may always performed a blinding decoding operation to identify whether the RMSI PDCCH is detected in the corresponding slot. However, in this case, power consumption and complexity of the terminal may increase. Through the above-described 1 bit indication information, the terminal may directly perform the reception operation through combining the RMSI PDCCHs and the RMSI PDSCHs without unnecessary blind detection and blind decoding procedures. In the above exemplary embodiment, the case where two slots are transmitted through the same beam has been described. However, the exemplary embodiment may also be applied to the case where three or more slots are transmitted through the same beam. When the RMSI PDCCH and the RMSI PDSCH are transmitted in three or more slots, whether the RMSI PDCCH and the RMSI PDSCH are actually transmitted in each of the corresponding slots may be sequentially signaled through 1 bit indication information. It may be signaled whether the RMSI PDCCH and the RMSI PDSCH are actually transmitted in each of the plurality of slots through a bitmap including bits corresponding to the respective slots. Meanwhile, when the RMSI PDCCH and the RMSI PDSCH are transmitted continuously in a plurality of slots, the overhead of signaling may be reduced by signaling the length of the slots transmitted consecutively (i.e., the number of consecutive slots in which the RMSI PDCCH and the RMSI PDSCH are transmitted) instead of the bitmap. In this case, SS/PBCH blocks and slots transmitted through the same beam may be interpreted as SS/PBCH blocks and slots having the same QCL (i.e., having QCL relation with each other), and may also be interpreted as SS/PBCH blocks having the same result in the above-described modulo (A, Q) operation and the slots in which the corresponding SS/PBCH blocks are transmitted.

Configuration of Apparatus According to the Present Invention

Figure 16:
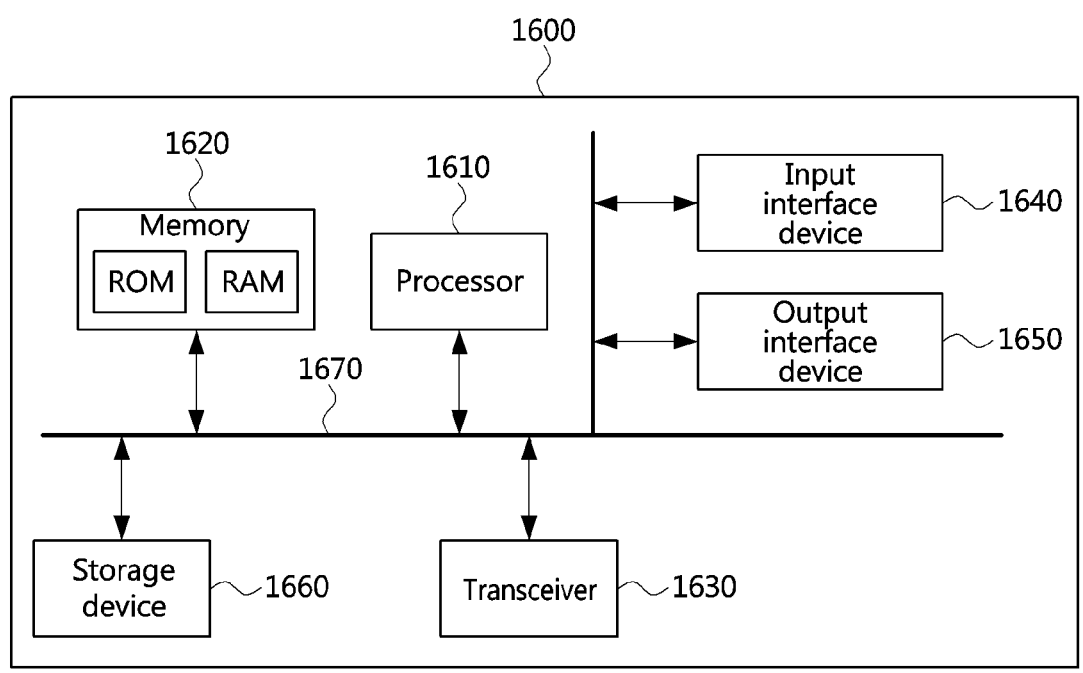
FIG. 16 is a block diagram illustrating a communication node according to exemplary embodiments of the present invention.

FIG. 16 is a block diagram illustrating a communication node according to exemplary embodiments of the present invention.

The communication node exemplified in FIG. 16 may be a terminal or a base station, as an apparatus performing the methods according to the exemplary embodiments of the present invention.

Referring to FIG. 16, a communication node 1600 may include at least one processor 1610, a memory 1620, and a transceiver 1630 connected to a network to perform communication. In addition, the communication node 1600 may further include an input interface device 1640, an output interface device 1650, a storage device 1660, and the like. The components included in the communication node 1600 may be connected by a bus 1670 to communicate with each other.

However, each component included in the communication node 1600 may be connected to the processor 1610 through a separate interface or a separate bus instead of the common bus 1670. For example, the processor 1610 may be connected to at least one of the memory 1620, the transceiver 1630, the input interface device 1640, the output interface device 1650, and the storage device 1660 through a dedicated interface.

The processor 1610 may execute at least one instruction stored in at least one of the memory 1620 and the storage device 1660. The processor 1610 may refer to a central processing unit (CPU), a graphics processing unit (GPU), or a dedicated processor on which the methods according to the exemplary embodiments of the present invention are performed. Each of the memory 1620 and the storage device 1660 may be configured as at least one of a volatile storage medium and a nonvolatile storage medium. For example, the memory 1620 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal for performing a random access in an unlicensed band mobile communication system, the operation method comprising:
    receiving a first synchronization signal/physical broadcast channel (SS/PBCH) block from a base station;
    determining an index of the first SS/PBCH block based on a result of a modulo operation between a first value derived from the first SS/PBCH block and a second value signaled from the base station; and
    performing a random access to the base station using at least one random access occasion corresponding to the determined index of the first SS/PBCH block,
    wherein a monitoring occasion of a control channel for receiving other system information, which corresponds to the determined index of the first SS/PBCH block, and/or a monitoring occasion of a control channel for receiving paging information, which corresponds to the determined index of the first SS/PBCH block, is configured.

2. The operation method according to claim 1, wherein the first value is a demodulation reference signal (DMRS) sequence index of a PBCH in the first SS/PBCH block.

3. The operation method according to claim 2, wherein the modulo operation is performed using the DMRS sequence index and the second value.

4. The operation method according to claim 1, wherein the first value is a candidate position of the first SS/PBCH block.

5. The operation method according to claim 4, wherein the modulo operation is performed using the candidate position of the first SS/PBCH block and the second value.

6. The operation method according to claim 1, wherein the second value is signaled from the base station through the first SS/PBCH block or through remaining minimum system information (RMSI).

7. The operation method according to claim 4, wherein the second value is an indication of a Quasi-Co-located (QCL) relationship between SS/PBCH blocks.

8. The operation method according to claim 1, wherein a plurality of random access occasions corresponding to the determined index of the first SS/PBCH block are configured.

9. The operation method according to claim 1, wherein the first SS/PBCH block shares the at least one random access occasion with a second SS/PBCH block having a same index as the determined index of the first SS/PBCH block.

10. The operation method according to claim 9, wherein the first SS/PBCH block and the second SS/PBCH block are received through a same beam.

11. The operation method according to claim 10, wherein the first SS/PBCH block has a Quasi-Co-Located (QCL) relation with the second SS/PBCH block.

12. An operation method of a base station for supporting a random access of a terminal in an unlicensed band mobile communication system, the operation method comprising:
transmitting a first synchronization signal/physical broadcast channel (SS/PBCH) block to the terminal;
determining an index of the first SS/PBCH block based on a result of a modulo operation between a first value corresponding to the first SS/PBCH block and a second value signaled to the terminal; and
receiving a random access preamble from the terminal using at least one random access occasion corresponding to the determined index of the first SS/PBCH block,
wherein a monitoring occasion of a control channel for transmitting other system information, which corresponds to the determined index of the first SS/PBCH block, and/or a monitoring occasion of a control channel for transmitting paging information, which corresponds to the determined index of the first SS/PBCH block, is configured in the terminal.

13. The operation method according to claim 12, wherein the first value is a demodulation reference signal (DMRS) sequence index of a PBCH in the first SS/PBCH block.

14. The operation method according to claim 12, wherein the first value is a candidate position of the first SS/PBCH block.

15. The operation method according to claim 12, wherein the second value is signaled to the terminal through the first SS/PBCH block or through remaining minimum system information (RMSI).

16. The operation method according to claim 12, wherein the first SS/PBCH block shares the at least one random access occasion with a second SS/PBCH block having a same index as the determined index of the first SS/PBCH block.

17. The operation method according to claim 12, wherein the first SS/PBCH block and the second SS/PBCH block are transmitted through a same beam.

18. The operation method according to claim 17, wherein the first SS/PBCH block has a Quasi-Co-Located (QCL) relation with the second SS/PBCH block.

* * * * *